(12) United States Patent
Funk et al.

(10) Patent No.: US 7,561,326 B2
(45) Date of Patent: Jul. 14, 2009

(54) LIGHT SCANNING MICROSCOPE AND USE

(75) Inventors: Joerg-Michael Funk, Jena (DE); Ralf Wolleschensky, Apolda (DE); Joerg Steinert, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 55 days.

(21) Appl. No.: 10/967,638

(22) Filed: Oct. 19, 2004

(65) Prior Publication Data

US 2006/0012871 A1    Jan. 19, 2006

(30) Foreign Application Priority Data

Jul. 16, 2004    (DE) ................. 10 2004 034 970

(51) Int. Cl.
G02B 21/00    (2006.01)
G02B 21/06    (2006.01)

(52) U.S. Cl. ........................ 359/368; 359/385
(58) Field of Classification Search ................. 359/368, 359/370–377, 385, 389
See application file for complete search history.

(56) References Cited

U.S. PATENT DOCUMENTS

| | | | | |
|---|---|---|---|---|
| 5,192,980 A | * | 3/1993 | Dixon et al. | 356/326 |
| 5,294,799 A | | 3/1994 | Aslund et al. | |
| 5,311,021 A | * | 5/1994 | Messerschmidt | 250/339.07 |
| 5,561,554 A | * | 10/1996 | White et al. | 359/368 |
| 5,732,172 A | | 3/1998 | Vann | |
| 6,028,306 A | | 2/2000 | Hayashi | |
| 6,031,661 A | * | 2/2000 | Tanaami | 359/368 |
| 6,088,097 A | | 7/2000 | Uhl | |
| 6,134,002 A | | 10/2000 | Stimson et al. | |
| 6,167,173 A | | 12/2000 | Schoeppe et al. | |
| 6,388,788 B1 | | 5/2002 | Harris et al. | |
| 6,914,720 B2 | * | 7/2005 | Tahara et al. | 359/368 |
| 2003/0142292 A1 | | 7/2003 | Wolleschensky et al. | |
| 2006/0152787 A1 | * | 7/2006 | Knebel et al. | 359/212 |

FOREIGN PATENT DOCUMENTS

| | | |
|---|---|---|
| DE | 2360197 A1 | 6/1975 |
| DE | 19702753 A1 | 7/1998 |
| DE | 10257237 A1 | 6/2003 |
| EP | 0542962 B1 | 8/1995 |
| EP | 0943950 A1 | 9/1999 |
| WO | WO 8807695 | 10/1988 |
| WO | WO 9222793 A1 | 12/1992 |
| WO | WO 03098200 A1 | 11/2003 |
| WO | WO 2004/051341 A1 | 6/2004 |

* cited by examiner

*Primary Examiner*—Alessandro Amari
(74) *Attorney, Agent, or Firm*—Jacobson Holman PLLC

(57) ABSTRACT

In a confocal laser scanning microscope with an illuminating configuration (2), which provides an illuminating beam for illuminating a specimen region (23), with a scanning configuration (3, 4), which guides the illuminating beam over the specimen while scanning, and with a detector configuration (5), which via the scanning configuration (3, 4) images the illuminated specimen region (23) by means of a confocal aperture (26) on to at least one detector unit (28), it is provided that the illuminating configuration (2) of the scanning configuration (3, 4) provides a line-shaped illuminating beam, that the scanning configuration (3, 4) guides the line-shaped illuminating beam over the specimen f while scanning and that the confocal aperture is designed as a slit aperture (26) or as a slit-shaped region (28, 48) of the detector unit (28) acting as a confocal aperture.

46 Claims, 17 Drawing Sheets

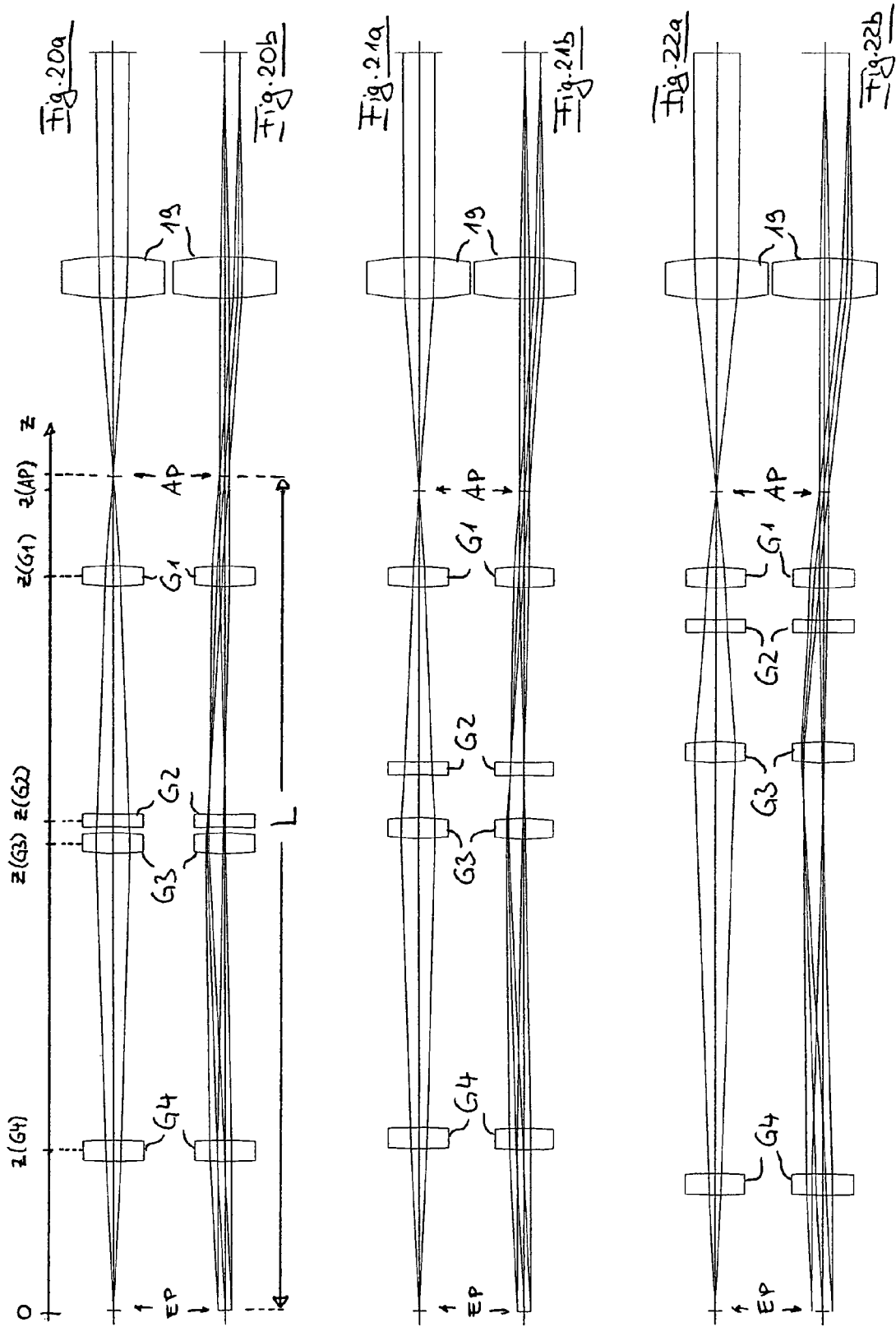

LIGHT SCANNING MICROSCOPE AND USE

BACKGROUND OF THE INVENTION

1. Field of the Invention

The invention relates to a confocal laser scanning microscope with an illuminating configuration, which provides an illuminating beam for illuminating a specimen region, with a scanning configuration, which guides the illuminating beam over the specimen while scanning, and with a detector configuration, which via the scanning configuration images the illuminated specimen region by means of a confocal aperture on to at least one detector unit.

2. Related Art

Confocal laser scanning microscopes of the type initially mentioned are known in the state of the art, for example, let us cite the German patent DE 197 02 753 A1 in reference thereto. Most recently, components and technical systems from microscopy, specifically from confocal imaging laser scanning microscopes, have been ever more frequently applied to spectroscopic imaging techniques. In this manner, it is possible to survey the spectroscopic characteristics of a selected specimen region without destroying or touching the specimen region. Confocal optic microscopy thereby makes it possible to selectively detect optical signals, which are generated within a diffractionally limited confocal volume whose magnitude lies in the realm of micrometers. Laser scanning microscopes with scanning laser beams and/or with specimen feed units can generate high focal resolution for two or three dimensional representations of the specimen under examination. Owing to this characteristic, confocal laser scanning microscopy has nearly asserted itself as the standard for fluorescent specimens in the field of biomedical technology.

Based on the highly exponential power of the chemical contents, confocal Raman microscopy is very attractive, particularly with regards to its application. The patent EP 0 542 962 B1 describes a setup for confocal Raman microscopy in which the appropriate selection of a spacially resolving two-dimensional detector is used to produce the condition of confocality.

A problem in Raman spectroscopy consists in that the levels of signal intensity are frequently lower by several orders of magnitude as compared to classical fluorescence spectroscopy. In practice, the integration time per measuring point frequently exceeds 1 minute. The periods of measurement resulting from that often span many hours or days, which naturally sets narrow limits on the capabilities of confocal Raman spectroscopy for recording two or three dimensional microscopic images with high dot density. A reduction in the integration time would theoretically be conceivable by increasing laser output performance, however, this quickly leads to the destruction of the specimen.

One is faced with similar problems in the area on non-linear optical microscopy, which, for example, offers attractive contrasting methods with the second harmonic generation but whose practical application however, is highly limited as well due to the low intensity of the signals and to the long measurement periods associated therewith.

A confocal microscope setup is known from the U.S. Pat. No. 6,134,002 in which a spectral analyzer is used as the detector. The analyzer admits the radiation through an entrance slit, whereby the linear slit region corresponds to a line region on the specimen. A dotted image is scanned on the specimen. The radiation to be detected is decoupled to the analyzer via a beam splitter acting as the primary color splitter, said beam splitter being located either between two scan mirrors of a scanning unit or being arranged in front of the scanning unit as seen in the direction toward the specimen. In the first-named variant, the dotted image on the specimen scanned by the two scan mirrors is only descanned in one spatial direction so that the spectral analyzer is impinged by radiation scanned along one line. In the second variant, the radiation is completely descanned by the scan mirrors and thereby comes to a rest state and can therefore be once more expanded with a cylindrical optical system toward a pinhole. The construction known from the U.S. Pat. No. 6,134,002 achieves an acceleration in image recording speed by shortening the periods of spectral analysis, which is why it forcibly depends on a spectral analyzer with a slit-shaped entrance region serving as a detector, thus it is highly limited with regards to a plurality of possible detectors. The initially mentioned problems associated with high laser performance are also a given factor in the design according to the U.S. Pat. No. 6,134,002.

SUMMARY OF THE INVENTION

The task set forth by the invention is therefore to expand upon a laser scanning microscope in such a manner that it can also record spectroscopic signals that are low in intensity within the shortest possible amount of time.

This task is resolved, in accordance with the invention, with a confocal laser scanning microscope of the type initially mentioned, in which, the illuminating configuration of the scanning configuration provides a line-shaped illuminating beam, the scanning configuration guides the line-shaped illuminating beam over the specimen while scanning and the confocal aperture is designed as a slit aperture or as a slit-shaped region in the detector unit acting as a confocal aperture.

The present invention is dedicated to the problems described by combining line-shaped illumination of the specimen with confocal detection by means of a slit aperture or of a region acting as a slit aperture. In contrast to point scanners, as used in the U.S. Pat. No. 6,134,002, a line-shaped region is illuminated on the specimen and confocally formed on a detector that is at least line-shaped.

As compared to a conventional confocal point laser scanning microscope with the same image recording time, with the same surface imaged in the sample, with the same visual field and with the same laser performance per pixel, a signal to noise ratio is produced that is improved by a factor of $\sqrt{n}$, if n is defined as the number of pixels in the detector line. For this, a value ranging from 500 to 2,000 is typical. The prerequisite for this is that the line illuminating the specimen exhibits the n-fold power of a laser focus of a comparable confocal point scanner.

If one does not wish to improve the detection speed or the signal to noise ratio with the laser scanning microscope in accordance with the invention, as an alternative and by comparison to a confocal point scanner with the same image recording time and the same signal to noise ratio, one can lower the radiation to which the specimen is exposed by a factor of n, if the punctiformly produced radiation power realized for a confocal point scanner is now distributed throughout the illuminating line.

As compared to a confocal point scanner, the line sensing laser scanning microscope thus makes it possible, by a factor of n, to more quickly form low intensity signals for sensitive specimen substances with the same signal to noise ratio and the same specimen exposure, to form an improved signal to noise ratio, by a factor of $\sqrt{n}$, with the same recording time, or with the same recording time, with the same signal to noise ratio and with a specimen exposure that is lower by a factor of n.

Depending on the desired resolution, one will want to illuminate a line varying in width on the specimen and detect it confocally. Illumination that is variable is therefore preferred. This can basically be achieved as early as the generation of line-shaped illumination. However, since the generation of linear illumination in a laser scanning microscope is purposefully accomplished in an illumination module, the expenditures for setting changes can run relatively high, if beams from different beam sources are collimated in the illumination module. It is therefore preferable, to use an optical zoom system disposing to this end of a zoom function for varying the width of the line of an already generated linear illuminating beam and said zoom system preferably located in a region of the beam path in which the illuminating radiation and the radiation to be detected are guided through the same optical elements, that is to say, are not yet separated. In the case of laser scanning microscopes, the scanned image region can be selected in the scanner by the proper control for adjusting the zoom function, but only when combined with a galvanometer scanner in the case of individual point scanning. Here, in the present case of parallel scanning, that is to say, simultaneous scanning of several points by laser scanning microscopes, a zoom function based on changing the position of the scanning configuration cannot be implemented since the points individually scanned on the line stand in an established geometric relation to one another. The variable magnification attained by the optical zoom system makes it possible to change the magnification setting of the scanned field for such multiple spot scanners that operate in parallel, in which a zoom function that is based on intervention at the level of the scanning arrangement is not possible due to the fixed geometric interrelation of the points projected in parallel over the specimen. The known approach of controlling spot to spot scanning in confocal scanning microscopes in such a manner that an image field is scanned in the desired and adjustable magnification is just as impossible in such parallel scanning systems as it is in systems that operate with resonance scanners, that is to say, in rotating mirrors driven by resonance vibrations, since the maximum deflection available there cannot be adjusted.

A possible position for the optical zoom system is to directly place it in front of the scanner unit (seen in the direction of the specimen). A preferably motor-driven optical zoom system makes it possible, by an adaptation of the zoom factor it produces, to continuously vary the diagonal visual field within a specific range of adjustment. Especially preferred is an optical zoom system which is adjustable in three optical degrees of freedom so that important parameters do not vary, such as focusing position, pupil position and imaging dimensions, when the width of the line is changed.

An objective achieves its maximum resolution in the case when the entrance pupil is fully illuminated. It is therefore purposeful to provide the appropriate means to ensure that the optical zoom system always fully illuminates the entrance pupil of the objective, regardless of the setting on the optical zoom system. As a consequence, another purposeful embodiment of the invention provides for the arrangement of an element acting as an aperture in the exit pupil of the optical zoom system, said element not being larger than the smallest exit pupil size, which occurs when the optical zoom system is in operation. As a result of this, the size of the entrance pupil is independent from the selected setting on the optical zoom system. Said size is purposefully equal or smaller than the size of the objective's entrance pupil.

During operation of the optical zoom system, the exit pupil can become very small when magnification is set to less than 1.0. If one wishes to avoid this very small exit pupil size as the lower value limit for the design, then it is purposeful to connect a telescope in front of the optical zoom system which shall effect the corresponding pupil dilation. Purposefully, this telescope shall only be activated during beam sweep when the optical zoom system operates in the scaled down mode. In this context, the concepts of "magnify" and "scale down" here relate to the image of the specimen.

The activation of this telescope ensures that the exit pupil of the zoom, which is provided at a magnification of 1.0, can be established as the lower limit for the design without causing the exit pupil to become so small during scaled down mode of the optical zoom system that the objective's pupil might possibly become underfilled. Based in the interchangeability of the objective, it is purposeful to design the element operating as an aperture as being interchangeable if one intentionally wishes to underfill the objective's pupil, that is to say, not to fully illuminate. In that case, for example, an adjustable iris diaphragm or a mechanism with different interchangeable apertures would come under consideration such as, for example, a focal wheel with different pinhole apertures.

In an especially compactly built form of embodiment, the element acting as a lens aperture is realized by the scanning unit; for example, the limited dilatation of the scanner mirrors can act as a lens aperture.

In an especially preferred form of embodiment of the invention, an optical zoom system is used which exhibits an exit side pupil in which an aperture is provided. In practice, this aperture can also be delimited by the surface of a mirror in the scanning unit. Based on the action of this exit side aperture of the optical zoom system, a fixed pupil size is always formed on the scan configuration or on the objective of the confocal laser scanning microscope, regardless of the setting selected for zoom magnification. The aperture advantageously prevents the incidence of unwanted stray light in the realm of the scanning configuration.

If one also wishes to set the zoom factor at less than one, it is advantageous to preposition the cylindrical telescope so as to fill the pupil. Preferably, this setting can be automatically activated, for example, in the form of a pivoting device. The exit side pupil, or the aforementioned aperture of the zoom objective, for example, is thereby prevented from being insufficiently illuminated. Regardless of any change in setting on the optical zoom system, it is thereby always ensured at the site of the objective pupil that there will always be an illuminated line adjustable in size so that specimen regions adjustable in size can be analyzed.

Upon activating the cylindrical telescope, an image brightness jump unavoidably occurs, since on the one hand, the cylindrical telescope is absorbing radiation and on the other hand, since above all, the intensity of the radiation is distributed over a longer line. In order to compensate for this effect in terms of the viewer, it is preferably provided in another form of embodiment, when the cylindrical telescope is switched in the beam path, that a control unit compensates for the reduction in image brightness caused by the telescope by an adjustment of the magnification factor of the detector configuration or by an adjustment in the scanning speed of the scanning device. Purposefully, this change carried out by the control unit is displayed for the user, for example, by the corresponding toggling of automatic controllers in a user program.

The inventors recognized that the problems associated with the axially varying position (in the direction of illumination) of the entrance pupil of the microscope objective could surprisingly be resolved by the appropriate design of the optical zoom system. The optical zoom system is advantageously designed in such manner that the imaging length (the distance between the entrance pupil and the exit pupil on the optical zoom system) can be varied so as to equilibrate the fluctuations in the axial positioning of the entrance pupil on the microscope's objective. The optical zoom system in accordance with the invention therefore achieves a double function in that, on the one hand, the scanning field parameters can be adjusted by varying the magnification, and on the other hand, the transmittance length can be adjusted in such a manner that an axially varying pupil position on the microscope's objective can be compensated for.

Furthermore, it is therefore purposeful that the optical zoom system is controlled by a control unit to be adjustable in such a manner that in a first mode of operation, a variable imaging length is produced. In order to adapt the optical zoom system to an activated objective, such as to a pivoting objective, it is purposeful to maintain magnification at a constant in this mode of operation.

Once the setting for the position of the pupil is in place, another mode of operation can be advantageously realized in which the magnification is set by guidance of the control unit so as to implement a zoom function without varying the imaging length. By virtue of the action of the optical zoom system in this mode of operation, the scanned field can be adjusted in terms of its size. If one synchronously uses a controllable double axis scanning unit, then in addition to and depending on the adjustment change in zoom magnification, a random region can be selected within the maximum permissible scanning field as a so-called "region of interest", whereby this "region of interest" need not be symmetrically located relative to the optical axis. During detection beam sweep, this displacement factor as well as the zoom magnification in the direction of the detector are once more cleared so that the observation of specific regions in a specimen is possible. In addition to this, images from different "regions of interest" can be acquired and subsequently recomposed into an especially highly resolved image.

An especially purposeful mode of construction of the optical zoom system uses four optical groups to implement variable pupil imaging. For the sake of manufacturing, it is favorable to provide the four optical groups, as seen in the direction of illumination, with positive refracting power, with negative refracting power as well as twice with positive refracting power. Purposefully, at least three of the optical groups are individually and independently adjustable by means of drives, and the displacement occurs in such a manner that the focus from infinite to infinite remains intact and depending on the mode of operation, the magnification or imaging length (pupil position) is adjusted. It can also be advantageous to design the last group, as seen in the direction of illumination, as one unit together with a scanning objective that is standard to a confocal scanning microscope, said scanning objective being positioned in front of the scanner unit. Each group is preferably comprised of at least one lens. In order to achieve the best possible characteristics in terms of available spectral range as well as possible apertures/field angles, the groups preferably have self-correcting capabilities in terms of image defects/imaging errors.

The mentioned selection of a "region of interest" either exclusively by way of the zoom function realized by the zoom objective, or also in addition to that, by way of an asymmetrical scanning mode of operation in the possible scanned field can further be improved by the use of an element that rotates the beam path. If, for example, an Abbe König prism is inserted into the pupil of the illuminating beam path, then the scanned, zoomed scan field can be rotated. In the detection beam path (mode), this rotation is once again cleared by the prism. Such an Abbe König prism can be obtained, for example, from LINOS Photonics, Germany and is known in the state of the art. For the mentioned design, it is rotatably arranged in the beam path, in proximity of the pupil since the beam cones converge at their narrowest here, and therefore an especially small prism can be used. Depending on the rotational angle, it introduces a rotation around the double angle of the image field.

Linear illumination can be produced in many ways. Especially advantageous however, is the use of at least one aspheric mirror. The basic principle involved in beam formation in the illuminating device is the case when by means of an aspheric mirror, a redistribution of spectral energy is achieved at least in one sectional plane and a inhomogeneous, specifically Gaussian profile distribution is transformed in such a manner that a largely homogeneous distribution of spectral energy predominates in the sectional plane. If the mirror is aspherically designed in two cross sectional directions, homogenization is obtained in two sectional planes, or therefore, an homogenized field is obtained. By the use of an aspheric mirror, a large spectral bandwidth can be covered by the illuminating radiation while simultaneously maintaining homogeneous illumination. It was thereby recognized that the reflecting aspheric mirror, which is more pronouncedly curved in one sectional plane in the region of the point of incidence of the source beam than in regions removed from the point of incidence, is suited for avoiding codependency on the wave length during focusing and distribution of spectral energy, whereby the concept of variable curvature of the aspheric mirror simultaneously opens up a great multitude of spectral energy distribution patterns. With said illuminating device, Gaussian beam bundles can be exemplarily reshaped in such a manner that in over 80% of the illuminated region, the intensity does not fall below 80% of the maximum value. This is a substantially homogeneous distribution of the type quite relevant here.

A variant with biaxial aspheric curvature can be applied in an especially advantageous manner for homogenization on an intermediate image plane. In the case of multiple point scanning microscopes, homogeneous illumination of an intermediate image in front of the element that generates the point cluster (e.g. Nipkow disc) makes it possible to evenly illuminate the specimen with a beam intensity that is essentially uniform for the region. The converting unit also makes a full illumination of the objective's pupil possible so that an especially good image (highly resolved) is achieved because when the pupil is homogeneously filled, this permits the optical resolution to be fully exploited.

A form of embodiment that is especially simple in execution is a mirror that is designed to be wedge-shaped with a rounded off dome. Such a mirror can be simply manufactured from a quadrangular prism and it yields a focal line with homogeneous distribution of spectral energy.

In a variant that can quite easily be mathematically described, the mirror is defined by a conic constant such as the rounded off radius of the dome and it satisfies the equation $y^2/[c+(c^2-(1+Q)y^2)^{1/2}]$ for the (x,y,z) coordinates relative to the z-coordinate, wherein "c" is the rounded off radius of the dome and "Q" is the conic constant.

For the line-shaped illumination, it is desirable to not only homogeneously distribute the radiation along a longitudinally extended line, but rather to possibly match the width of the line to the diameter of the entrance pupil of the subsequent optical system. In order to achieve this, the aspheric mirror must also effect an expansion of the beam perpendicular to the direction of the line. This is especially easy to achieve with the above-mentioned variant of the wedge-shaped mirror with a rounded off dome in that the mirror surface or at least the dome along the dome's longitudinal axis is spherically or aspherically curved.

The aspheric mirror with the rounded off dome is then curved in two dimensions, whereby in a first sectional direction (perpendicular to the longitudinal axis) a cone with a rounded off point can be provided, and in the second sectional direction (along the dome), a parabolic, spheric or aspheric curvature can be provided. The latter curvature then sets the width of the illuminated field, whereas the aspheric form, perpendicular to the longitudinal axis, effects the expansion along the field and based on the aspheric quality, it determines the distribution of spectral energy. Along the field, a largely homogeneous spectral energy distribution is thereby achieved.

An additional mirror, spherically or parabolically curved along the dome can be mathematically simply expressed as follows: $f(x,y)=\sqrt{(a(y)-r_x)^2-x^2}-r_x$, wherein $r_x$ is the radius of curvature along the dome, that is to say, in the second sectional direction mentioned above.

In order to effect adaptative image matching in the case of the mirror curved in two directions (e.g. aspheric in the first sectional direction, spheric in the second) for full illumination of an intermediate image or of the entrance pupil to the immediately consecutive optical system, it is purposeful to arrange after the mirror a converging optical system, e.g. in the form of a concentrating reflecting mirror. Normally, to this end, a cylindrical or toric concentrating reflecting mirror is used for generating a rectangular field. For other field forms, the shape of the mirror can vary, for example, one can also use the mentioned aspheric mirror for this second mirror in order to achieve a combination of homogenizing the light filled pupil in a first direction (by one of the aspherical mirrors) and the intermediate image in the remaining direction (by the other aspherical mirror). By the use of the additional aspherical mirror, image defect/imaging error compensation can also be effected. The second aspherical mirror can also be provided in addition to the concentrating reflecting mirror.

For the form of embodiment of the aspheric mirror with spherical curvature in the second sectional plane, it is therefore preferable that the concentrating reflecting mirror exhibits a curvature radius equal to $r_x+2\Box d$ in the x-direction, whereby "d" is the distance between the aspheric mirror and the concentrating reflecting mirror. The radius of curvature $r_x$ of the aspheric mirror in the second sectional plane then directly scales the height of the illuminated rectangular field or of the profile of the illuminating beam.

Of course, for homogenous pupil illumination, a mirror can be used that is aspheric in both sectional directions. In the case of a rotationally symmetrical aspheric mirror, this would then create a homogeneously illuminated circular field; otherwise one would obtain an elliptical field.

When the pupil is illuminated in such a manner, one is then able to select and use individual regions in the scanning process, e.g. by means of Nipkow discs, slit apertures or such similar.

For illuminating the aspheric mirror, it is advantageous to set up the axis of symmetry of the mirror at an angle of between 4° and 20° to the incident axis of the source beam, which has, for example, a Gaussian-shaped profile, since a compact layout can then be obtained. The subsequently arranged concentrating reflecting mirror, which can, for example, be designed as cylindrical or toric, gathers the radiant energy distributed around by the aspherical mirror and compensates for disseminated wave aberrations during propagation. In simple cases where such wave aberrations are of no consequence, then a spherical lens can be used in place of the concentrating reflecting mirror.

Preferably provided in the laser scanning microscope is a decentralized zoom function produced by means of a second optional, independently acting scanning unit, that is to say, with crop function.

Confocal imaging can be produced by a slit aperture in the laser scanning microscope. Preferred is a slit aperture which can be continuously adjusted in terms of its aperture width so that a random airy diameter can be created on the detector. The continuous adjustment can, for example, be achieved by slit apertures realized by means of solid state articulation technology. As an alternative, a slit aperture unit can also be used with several interchangeable slit apertures of different aperture width. For example, fixed slit diaphragms, e.g. structured chrome masks, of different widths can be arranged on a slider/shutter.

In a solution that is especially simple to realize, the detector unit itself acts as a slit aperture. To this end, for example, a detector line with pixels in a row can be used. It is also possible that the detector unit is comprised of a spacially resolving two-dimensional radiation sensor, crosswise to the direction of the slit, said sensor being arranged in the confocal plane, whereby the two-dimensional radiation sensor acts as a confocal slit aperture in selecting a subregion on the surface. In this manner, the effect of a variation in the slit aperture diameter can be achieved at the level of the sensor by a corresponding selection of the region of interest, for example, with a CCD [charge coupled device] array or a CMOS [complementary metal oxide semiconductor] detector array.

In the laser scanning microscope, of course, various spectral channels can be used for illumination as well as for detection. In terms of this, an especially large variation is possible when the scanning configuration separates the projected radiant illumination from the irradiation returned by the specimen region by means of a primary color splitter, wherein the color splitter can be produced as a strip mirror in accordance with the German patent DE 102 57 237 A1, whose revealed contents are explicitly integrated here.

Such a strip mirror acts as a spectrally independent primary color splitter. It lies in a pupil plane of the scanning configuration in which radiant illumination reflected at the level of the specimen is formed in the shape of a line, that is to say, as coherent radiant illumination. In contrast to this, the incoherent signal radiation emitted that is to be detected fills the entire plane of the pupil and is only insubstantially weakened by the narrow strip mirror. Thus, the concept of the "color splitter" also covers splitter systems that act non-spectrally. An homogenous neutral splitter (e.g. 50/50, 70/30, 80/20 or such similar) or a dichroic splitter can also be used instead of the spectrally independent color splitter described.

To make an application based selection possible, the primary color splitter is preferably provided with mechanical means that allow for a simple change, for example, with a corresponding splitter disc containing individual, interchangeable splitters.

A dichroic primary color splitter is especially advantageous in the case when coherent, that is to say, when oriented radiation is to be detected such as, for example, Stoke's or anti-Stoke's Raman spectroscopy, coherent Raman processes of the higher order, general parametric non-linear optical processes such as second harmonic generation, third harmonic generation, sum frequency generation, two photon absorption and multiple photon absorption or fluorescence. Several of these processes from non-linear optical spectroscopy require the use of two or several laser beams that are co-linearly superimposed. To this end, the described unification of illuminating beams from several lasers proves to be especially advantageous. Basically, the dichroic beam splitters widely used in fluorescence microscopy can be applied. It is also advantageous for Raman spectroscopy to use holographic notch splitters or filters in front of the detectors to suppress Rayleigh scattering.

In the case of detection with several separate spectral channels, the emitted signal radiation is separated into spectral segments by means of a secondary color splitter, whereby each secondary color splitter provides an additional spectral channel. The individual spectral segments are then focused on the strip-shaped region, conjugate with the object plane, by means of round and/or cylindrical optical systems. This slit aperture region exhibits partial confocality and after being spectrally filtered, for example by an emission filter, with the help of an optical group (e.g., by means of cylindrical lenses) is imaged on a suitable detector with focal resolving power in the direction of the slit, e.g. a CCD line camera or an optical multichannel analyzer.

As an alternative or additionally, a spectrometer can be used as a detector, which spectrally divides the linear radiation crosswise to the line and directs it to a two-dimensional radiation sensor. An entrance slit in the spectrometer can serve as a confocal aperture for this. If one wishes to analyze processes with timing resolution, it is appropriate to use a streak camera as the detector unit that temporally divides the linear radiation crosswise to the line and directs it to a two-dimensional radiation sensor.

The positionally resolved signal from the sensor then contains the space coordinate in the one coordinate, and the time and wave length coordinate in the other, which reflects the temporal development or the spectral composition of the radiant signal emitted by the individual pixels along the space coordinate.

For the detection of linear or non-linear Raman signals and based on a polarization dependent illumination or detection, one can analyze the symmetry of the molecular vibrations to be detected and/or suppress the non-Raman resonant background fractions. It is therefore preferable for such applications, that at least one polarizer be used in the illuminating configuration and that at least one polarization analyzer be used in the detector configuration.

In the mentioned form of embodiment with several spectral channels, which are each respectively comprised of one detector unit, an independent slit aperture can be used in each spectral channel. For the purpose of simplifying the construction, a common slit aperture can also be optionally positioned in front of all of the spectral channels.

For simply aligning the position of the confocal slit-shaped element (e.g. of the slit aperture or of the detector), one can design this element to be correspondingly sliding. Simpler in terms of construction however, is to provide a correcting device in the illuminating configuration and/or in the detector configuration that has at least one plane parallel transparent plate, which is supported in a holding fixture in the path of the beam and based on said fixture, which can be driven into a tilting and/or pivoting motion around at least one axis so that by virtue of the change in the tilt position of the plate, a certain parallel shift of the beams can be set in the beam path.

The correcting device has the advantage of making a simple compensation or correction possible of the defects/errors arising for imaging in the optical configuration, more specifically, the following can be simply corrected: ambient temperature or system temperature, position of the interchangeable or movable elements in the configuration, errors in color due to the wave length or wave length ranges of the radiation used. Depending on the requirement, a uniaxial tilting or pivoting motion can hereby suffice. If one wishes to provide a biaxial parallel shift, either a biaxial tilting or pivotable plate can be provided, or two different uniaxial tilting or pivotable plates can be provided. Essential for the invention is that the plane parallel plate with the holding fixture can be tilted in the path of the beam in a defined and known manner. For a biaxial positional change, any combination of tilting and pivoting motion is valid. A combination of a tilting motion with a pivoting motion is hereby relatively simple to mechanically produce and surprisingly, it does not yield any disadvantage along the optical axis in spite of the shift occurring for the plane parallel plate during the pivoting motion.

The correction effected by the device can be initiated manually by the user, for example, during adjustment in the manufacturing plant. Especially preferred however, is an expanded form of embodiment with a setting/correcting unit which is comprised of at least one operating parameter of the optical configuration and which sets the tilting position as dependent on the value of the operating parameter. The tilting position can exemplarily be stored to memory in calibrating tables. It is also possible, to optimize a correction, permanently, regularly or on demand, by setting the tilting position via active control loops. For such a design, it is preferred to provide a feedback control system that uses the tilting position of the plate as a correcting variable so as to balance the depicted effects on the imaging optical configuration. In this manner, eventual errors of temperature or long term drift errors present in the optical configuration can be simply corrected.

Since it is known that the parallel shift of the plane parallel plate depends on the refractive index of the transparent plate material, it is possible in the case of polychromatic radiation, that chromatic cross-aberrations may develop in the beam path of the optical configuration owing to a wavelength related parallel shift due to dispersion of the plate material. By constructing the plane parallel plate out of one or several graduated plates, one can compensate for such chromatic cross-aberrations originating from the plane parallel plate.

The correcting device can also be applied for use in countering varying chromatic cross-aberrations of the optical image that are due to operating conditions. For example, if an optical configuration is suited to operate with different wave lengths, then it is possible that chromatic cross-aberrations arise that are associated with wave lengths and are therefore dependent on operating conditions. The correcting device can then bring the plane parallel plate into another tilting position, depending on the wave length range currently in use in the optical configuration and on the therewith associated chromatic cross-aberrations, so that in the end effect, in spite of operation with different wave length ranges, the optical image remains unchanged in the configuration. Also for said correction, an appropriate setting/correcting unit can be used, as previously mentioned, which could also exhibit a feedback control system.

The requirements in precision or sensitivity with which the drive is displaced over the holding fixture, as well as the accessible parallel shift range and the thickness of the plane parallel plate can be programmed in.

As previously mentioned, the correcting device reduces the number of required movable optical elements in the optical imaging configuration. This advantage is especially significant when the confocal microscope exhibits exchangeable beam splitters with which an adaptation to various applications ensues, that is to say, a change in the projected wave lengths or selected wave lengths. The correcting device corrects the errors originating from the variable optical elements without interfering with the optical image. Furthermore, the correcting device can also be positioned between the confocal aperture and the detector and can thus aptly parallel shift the beam path (image) between the aperture and the detector.

Compensation for deviations perpendicular to the slit aperture as well as compensation for deviations parallel to the slit aperture can be adjusted via a corresponding setting for the tilting position of the plane parallel transparent plate.

In the first case, it must be checked whether the light originating from the specimen falls exactly on the slit aperture, and is not off center above or below the slit aperture. In the second case, it must be checked whether the light originating from the specimen correctly hits the line detector and that there is no pixel misalignment between the images of two detection channels in the system, which exemplarily each have their own line detector. In this manner, the confocal microscope can achieve an image registration that is accurate down to the subpixel while configured with multiple channels.

Furthermore, the correcting device is additionally advantageous in the confocal microscope in the sense that from now on, a narrow detector line can be used without requiring any movement from the slit aperture or the detector. It is then altogether avoided, in the case of misalignment (caused by tilting and wedge errors in interchangeable elements) after adjusting the slit aperture to increase resolution, that light flux is unnecessarily lost and thereby causing the signal to noise ratio to drop.

Since the tilting or wedge errors of individually switchable optical elements are likely to be repeated, the tilting position of the transparent plane parallel plate can be selected in a simple manner. Upon changing a switchable optical element, only one specific drive of the plane parallel transparent plate is needed in order to set the new tilting position required for the desired configuration of the microscope. Therefore, an expanded form of embodiment of the microscope is preferred, in which interchangeable or positionally adjustable elements are provided in the path of the beam and in which the setting/correcting unit interprets a configuration of interchangeable or positionally adjustable elements in the form of operating parameters and sets the tilting position based on the value of operating parameters.

An example for such parameters, in which not only the maladjustment of the optical image is corrected in terms of the slit aperture, but also the chromatic cross-aberrations, advantageously provides for the presence of radiation in different wave lengths in the beam path of the microscope, whereby the setting/correcting unit sets the tilting position based on the length of the waves. One or several plane parallel plates is/are then arranged in front of each detection channel and the tilting position of the plane parallel plate is set by the setting/correcting unit depending on the length of the waves or on the wave length range in the actual channel.

An especially comfortable user operation is obtained when a control loop is provided which maximizes the radiant intensity in the detector unit, and/or which minimizes the image shift/misalignment in that the tilting position of the plane parallel plate is used as a correcting variable. With this, long term effects or temperature changes which bring about maladjustments can be rectified at any time without needing a service technician.

In another expanded form of embodiment, the microscope in accordance with the invention provides the specimen with wide field illumination and that said specimen is imaged by scanning of the dotted spot or dot group spot.

Henceforth, the invention advantageously uses wide field illumination in combination with scanning detection. With this surprisingly simple measure, there is no need for a separate detector. One simultaneously obtains an additional plethora of advantages.

For wide field illumination, radiation sources can be used that are already present in laser scanning microscopes for normal optical observation. A switch-over mechanism is no longer required. On the whole, the resulting construction is simplified. Preferably, the wide field illumination source is achieved by passing light illumination of the specimen. As an alternative and in addition, wide field incident light illumination is also possible, for example, to conduct epifluorescent measurements or optical reflectance measurements. Both modes as well can be realized simultaneously (incident light illumination and passing light illumination).

The depth discriminating capability of the confocal detector configuration thereby permits a transmittance measurement that is resolved for depth.

By using wide field illumination sources usually already in place that conventionally have very broad bands as compared to the excitational illuminating sources provided for scanning, white light transmittent illumination operations can be performed, which were not possible in this manner in the conventional laser scanning microscopes due to the requirements of confocal imaging or if so, then only under enormous expenditures on the light source side. By analogy, the same is true for wide field incident light illumination.

Based on scanning of a specimen with wide field illumination by means of the scanned detectors, the spectral analysis capability of the detector configuration present in the laser scanning microscope can also be used during transmittance operations thus leading to improved characterization of the specimen.

The wide field illumination can be operated independent of the scanned spot-shaped illumination. Of course, the control unit can also initiate simultaneous operation in that the specimen is then simultaneously analyzed in the transmittance operation mode as well as in the conventional fluorescent operation mode.

Exemplarily, the control unit can aptly select different spectral channels so that in some of the spectral channels, fluorescent information on the specimen is acquired, whereas in other spectral channels, transmittance information is acquired. The proper synthesis of said information, for example, in an overlay image yields an analysis of the specimen that is superior to that derived from conventional systems. It is therefore preferred to have the control unit simultaneously control both the operation of spot illumination configuration and of the wide field illumination source so as to properly select the spectral channels for the spot detector configuration.

Another advantage of the approach in accordance with the invention lies therein that it is also possible to have simultaneous transmittent light scanning at several points now, which was not permitted by conventional detectors separately arranged under the specimen due to the lack of suitable focalized resolution. The use of multiple point or point group scanners under transmittent light operation now opened by the invention reduces eventual problems associated with temporal fluctuations in wide field illumination, since said problems can be corrected by the proper extension of the integration time for multiple point or point group systems. It is therefore preferred that both wide field illumination and the scanned point or point group shaped illumination be simultaneously carried out. Under "point group", we understand any configuration of multiple points, in particular, in the form of a line which the laser scanning microscope confocally illuminates and images. By virtue of this approach, the specimens are exposed to lesser radiation stress and shorter measuring periods are advantageously realized which were not possible in the prior state of the art. It is therefore especially preferred that the spot detector configuration implement a confocal point group formation, for example, with at least one Nipkow disc and with at least one matrix detector. The spot detector configuration can also use a confocal slit aperture with a line detector when the point group is composed of a line.

The use of wide field illumination finally opens up entirely new contrast media processes for transmittent light measurement. Now, all of the contrast media processes are possible as they are known in the state of the art for conventional optical light microscopy. In order to realize this, it is preferable that the wide field illumination source exhibits a condenser in which the contrast media are switchable. For example, one can realize the illumination of a dark field in that a suitable annular lens is arranged in the condenser.

Other additional contrast media methods are also conceivable if the scanning configuration exhibits a scan objective in which suitable contrast media can be switched at the level of the pupil. In combination with the introduction of contrast media in the condenser, then not only is dark field contrast possible, but rather phase contrast, VAREL contrast, polarization contrast or differential interference contrast as well.

An additional analysis of time resolved processes is possible in the laser scanning microscope with the aid of gated detector arrays and of known pump and specimen technology.

Based on the partial confocality generated by the aperture slit, an improved separation of microsectional thickness is achieved as compared to the optical wide field illumination. In combination with high speed zoom focusing, the line scanner in accordance with the invention therefore also succeeds in producing a three dimensional reconstruction of expanded specimens. High speed z-canning can be realized by moving the specimen in the z-direction (e.g. by means of high speed mechanical drives or piezoelectric specimen movement), by moving the objective in the z-direction (e.g. by means of high speed mechanical drives or piezoelectric objective movement), or by objective internal focusing or high speed adaptive optical systems.

The laser scanning microscope in accordance with the invention enables processes for the detection of weak spectroscopic signals in microscopic configurations. The fields of application cover the vast expanse from microspectroscopy and microanalytics to "real" two dimensional and three dimensional microscopic image rendition. A hereby preferred process covers Stoke's confocal or anti-Stoke's Raman microscopy. But basically, any spectroscopic method can be used with the microscope in accordance with the invention for microscopic contrasting—and preferably such methods with signals that are weak in intensity. Conceivable as such methods, for example, are: luminescence spectroscopy (fluorescence, in particular, fluorescence polarization measurements, chemoluminescence, bioluminescence, phosphorescence), infrared microscopy, circular dichroism (CD) spectroscopy, hyper-Raman spectroscopy, stimulated Raman spectroscopy, coherent Stoke's or anti-Stoke's Raman spectroscopy (CARS, CSRS as well as all coherent Raman processes of the higher order, so-called HORSES), general parametric non-linear optical processes such as second harmonic generation (SHG), third harmonic generation (THG), sum frequency generation (SFG), two photon absorption and multiple photon absorption or fluorescence.

Several of the above-mentioned methods of non-linear optical spectroscopy require two or several lasers whose beams are overlaid in a co-linear manner. The represented collimation of beams from several lasers proves to be especially advantageous for this.

Potential uses for the invention cover all of the methods in which high focal microscopic resolution is routinely combined with classical spectroscopy. The application of the invention is particularly advantageous when, on a routine basis, that is to say, without high temporal expenditures, two dimensional and three dimensional substance distributions are to be quasi followed in real time. A very promising field of application is therefore found in the chemical and pharmaceutical characterization and process control of active ingredient distribution in fibers, foils, lacquers/polyurethane paints, dispersions, suspensions, emulsions, plastics, tablets, etc. Particularly interesting hereby is the analysis of crystalline and amorphous solid matter (e.g. the analysis and distribution of imperfections in crystals). In addition to the microanalytical characterization of existing substances, the pursuit of chemical process sequences is also conceivable, for example, for transformations into microfluid reagents in the rearrangement of crystals and in solid state polymerization.

In the area of medical technology, especially the spacially resolved, non-invasive determination of active substances with the aid of Raman spectroscopic methods is of particular interest. The use of Raman spectroscopy in the area of medical applications is frequently limited due to the required laser spectrum density output in the focus and because of the associated destruction of living human tissue. As compared to point scanners counterparts, the use of the line scanner in accordance with the invention makes it possible to conduct measurements on the specimen in the same amount of recording time and with the same SNR while lowering specimen exposure by a factor of n (n=500-2000). As a practical application, let us mention the determination of inhomogeneous distribution of pigments and antioxidants in the human eye and skin.

Another potential field of application for the described invention exists in high throughput Raman screening of microtiter plates (multiwell plates) in the area of pharmaceutical development of active ingredients. Frequently of special interest hereby are Raman spectroscopic studies on polymorphism, which not only require less expenditures equipment-wise than in x-ray structure analyses but which can also be conducted in specimens with a supernatant solution.

BRIEF DESCRIPTION OF THE DRAWINGS

In the following, the invention shall yet be more closely detailed with reference to the drawing as an example. Shown in the drawings are.

DETAILED DESCRIPTION OF THE PREFERRED EMBODIMENTS

Figure 1:
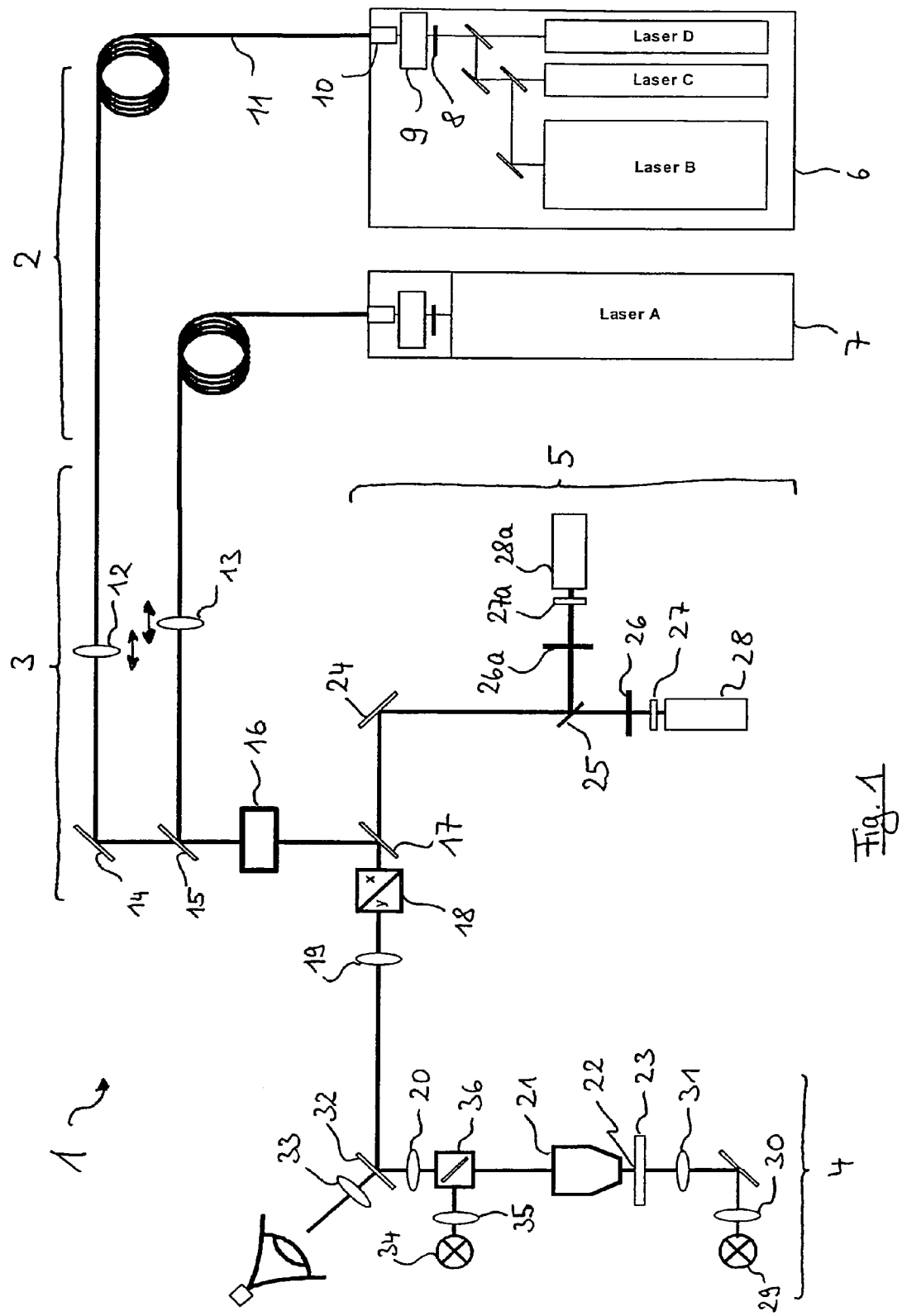
FIG. 1 a schematic representation of a laser scanning microscope.

FIG. 1 schematically shows a laser scanning microscope 1, which is basically comprised of five components: of a beaming source module 2, which generates excitation radiation for laser scanning microscopy, of a scanning module 3, which conditions the excitation radiation and properly deflects it for scanning over a specimen, of a microscope module 4, which directs the scanning beam made available by the scanning module in a microscopic beam path over the specimen, as well as of a detector module 5, which receives radiation and detects optical irradiation from the specimen. The detector module 5 can hereby be spectrally designed to have multiple channels, as represented in FIG. 1.

The beaming source module 2 generates illuminating radiation, which is suited for laser scanning microscopy, more specifically, radiation which can release fluorescence. Depending on the application, the beaming source module exhibits several sources of radiation to this end. In a represented form of embodiment, two lasers 6 and 7 are provided in the beaming source module 2, after which are connected on the load side a light valve 8 as well as an attenuator 9 and which couple their radiation into a fiber optical wave guide 11 via a coupling point 10. The light valve 8 acts as a beam deflector by which beam cut-out can be effected without having to switch off the operation of the very lasers in the laser unit 6 or 7. The light valve 8 is designed as an AOTF which deflects the laser beam, before coupling into the fiber optical wave guide 11, in the direction of a light trap, not represented here, for the purpose of cutting out the beam.

Figure 6:
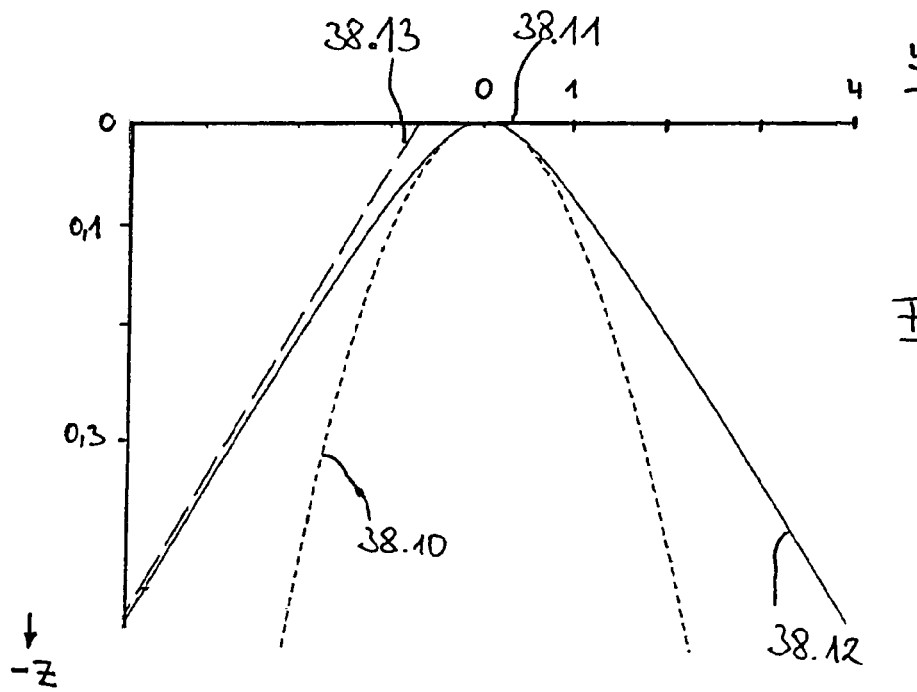
Figure 7:
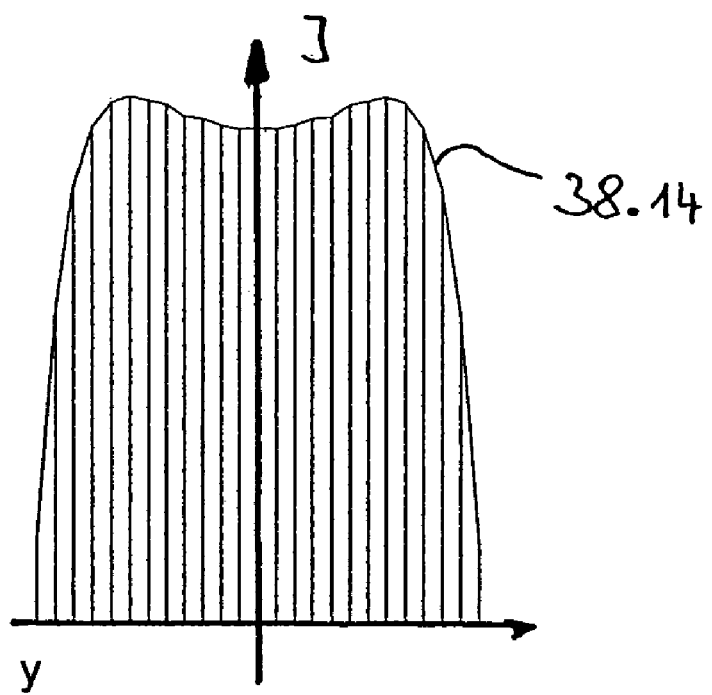

In the exemplary representation of FIG. 1, the laser unit 6 exhibits three lasers B, C, D, whereas laser unit 7 only comprises one laser A. The representation in FIGS. 6 and 7 is thus exemplary of a combination of single and multiple wave length lasers which are individually or also collectively coupled to one or several fiber optics. Coupling can also be done simultaneously via several fiber optics whose radiation is mixed by a color combiner at a later point after running through an optical adaptor. In this manner, it is possible to make use of the most varied wavelengths or wavelength ranges for excitation radiation.

The radiation coupled into the fiber optical wave guide 11 is concentrated by means of optical collimation systems 12 and 13 sliding over beam uniting mirrors 14, 15 and is modified in terms of its beam profile in a beam forming unit 16.

The collimators 12, 13 ensure that the radiation conducted from the beaming source module 2 to the scanning module 3 is collimated into an infinite beam path. In each case, this is advantageously achieved by a single lens which, under the control of a (non represented) central control unit, has a focusing function by its displacement along the optical axis in that the distance between the collimator 12, 13 and the respective end of the fiber optical wave guide is modifiable.

The beam forming unit 16, which shall later be explained in more detail, generates a line-shaped beam from the rotationally symmetrical, Gaussian profiled laser beam, as it exists emergent from the beam uniting mirrors 14, 15, said line-shaped beam no longer being rotationally symmetrical in its profile but rather suited for generating an illuminated rectangular field.

This illuminating beam, also referred to in the following as line-shaped, serves as excitation radiation and is guided to a scanner 18 via a primary color splitter 17 and via an optical zoom system, yet to be described. The primary color splitter shall also be detailed later, but let it just be mentioned here, that it has the function of separating the excitation radiation from the irradiation returning from the specimen that originated from the microscope module 4.

The scanner 18 deflects the line shaped beam into one or two axes, after which said beam passes through a scanning objective 19 as well as through a tube lens 20 and an objective 21 to be bundled into a focus 22, which lies in a preparation or in a specimen 23. The optical image is hereby produced such that the specimen 23 is illuminated in a focal line with excitation radiation. A biaxial deflection by the scanner 18 is optional; it can, as shall later be detailed, be used for the selection of a scanning region or ROI [region of interest] lying asymmetrically to the optical axis.

Fluorescent radiation excited in the linear focus 22 in such a manner arrives, via the objective 21, the tube lens 20 and the scanning objective 19, back at the scanner 18 so that in the reverse direction toward the scanner 18, a beam is to be found once more at rest. One therefore also speaks of it in such terms that the scanner 18 descans the fluorescent radiation. The specimen is simultaneously illuminated and scanned in parallel at several points on the line. The line therefore represents a point group.

The primary color splitter 17 lets the fluorescent radiation lying in wave length ranges other than those of the excitation radiation pass so that it can be rerouted via the deflecting mirror 24 in the detector module 5 and can then be analyzed. The detector module 5 exhibits in the form of embodiment in FIG. 1 several spectral channels, that is to say, the fluorescent radiation coming from the deflecting mirror 24 is divided into two spectral channels in a secondary color splitter 25.

Each spectral channel comprises a slit aperture 26 which produces a confocal or partially confocal image of the specimen 23 and whose aperture size establishes the depth of focus with which the fluorescent radiation can be detected. The geometry of the slit aperture 26 therefore determines the microsectional plane within the (thick) preparation from which fluorescent radiation is detected.

Arranged after the slit aperture 26 is also a blocking filter 27, which blocks off undesirable excitation radiation arriving in the detector module 5. The line-shaped fanned-out beam separated off in such a manner, originating from a specific depth segment is then analyzed by an appropriate detector 28. The second spectral detection channel is also constructed in analogy to the depicted color channel, and also comprises a slit aperture 26a, a blocking filter 27a as well as a detector 28a.

In addition to confocal scanning of a specimen region illuminated with a focal line, the laser scanning microscope 1 represented in an optional mode of construction in FIG. 1 makes it possible in terms of said construction to also have other modes of operation. To this end, a halogen lighting fitting 29 is provided whose radiant emission is directed on the specimen 23 in a wide field of illumination via an optical lamp system 30 and a condenser 31 counter to the direction of sight of the optical scanning system 19. Transmitted fractions of this illumination are also scanned in the scanning process by means of the objective 21, the tube lens 20, the scan objective 19 and the scanner 18 and are spectrally analyzed by means of the primary color splitter 17 in the detector module 5. Detection via the scanner 18 effects the focal resolution in the form of specimen sensing and at the same time, a wide field of illumination is made possible by the halogen lamp 29.

The same concept can also be applied to the evaluation of rereflected radiation and epifluorescent radiation in that the illuminating radiation is coupled into the telescopic barrel of the microscope module 4 via a mercury vapor lamp 34 with an optical lamp system 35 on a beam splitter 36. This radiation then arrives on the specimen 23 via the objective 21. The illumination here is also produced without the participation of the scanner 18. In contrast, detection process then takes place in turn via the optical scanning system 19 and the scanner 18 in the detector module 5. For this expanded form of embodiment, the detector module 5 therefore has a double function. On the one hand, it serves as a detector for scanned projected excitation radiation, whereby the scanner 18 serves both for the projection of the excitation radiation as well as for the descanning of the detecting radiation. On the other hand, the detector module 5 acts as a spacially resolving detector when no further structured radiation is being projected on to the specimen, namely either in the form of wide field illumination from below or via the objective 21.

But the scanner 18 also has a double action as well since it achieves focal resolution by point group or point formation scanning of the specimen not only for projected point group or point formation excitation radiation, but rather also for wide field illumination.

Beyond this, the laser scanning microscope 1 in FIG. 1 now makes it possible to have a combination operation in which projected point formation or point group formation excitation radiation from the radiation source module 2 as well as from wide field illumination from the halogen lamp 29 or from the mercury vapor lamp 34 is directed on the specimen 23 and by means of the scanner 18 and of the detector module 5, a corresponding point formation or point group formation scanning of the specimen is carried out, said specimen being exposed in such a manner to multiple means of radiation. Based on the appropriate selection of the secondary color splitter 25 through 25c, classical transmittance or reflection microscopy can thereby be combined with laser fluorescent measurement. The scanned image information acquired in this manner by means of signal recognition through the detectors 28 through 28c can then be individually evaluated or evaluated in overlay form and represented as such.

For wide field illumination, a field aperture is preferably provided between the optical lamp system 30 and the condenser 31 in order to adjust the illuminated field. Furthermore, the aperture diaphragm in the condenser 31 is switchable. It lies in a position conjugate with the planes of the pupils of the laser scanning microscope. In the case these pupil planes, we are dealing with the plane of the pupil in which the scanner 18 lies as well as with the plane in which the primary color splitter 17 is arranged. As an aperture diaphragm such as in the plane of the pupil, one can now integrate different kinds of optical elements so as to be able to use known contrast methods from classical microscopy, such as for example, dark field, phase contrast, VAREL contrast or differential interference contrast. Suitable aperture diaphragms or elements to be introduced in the plane of the pupil are detailed, for example, in the publication "Microscopy from the very beginning", Carl Zeiss Microscopy, D-07740 Jena, 1997, pages 18-23. The revealed contents of this company publication are hereby explicitly integrated in reference to this. For such contrasting method interventions of course, this pupil plane is not the only one coming under consideration. There are also other pupil planes suitable to this end. For example, intervention could be implemented in the proximity of the primary color splitter 17 or by means of an optical relay system after the secondary color splitter 25 in one (or several) spectral channels of the detector beam path.

The use of a confocal slit aperture in the detector module 5 serves only as an example. In principle, random configurations of multiple points such as point clusters or Nipkow disc concepts can be used for parallel scanning of point groups. However, what remains essential is that the detector 28 be spacially resolving so as to enable the scanner to detect several specimen points in parallel on a sweep run.

Based on this concept, the non-descanned detectors required to date in the state of the art in the microscope module 4 are no longer needed. Furthermore, owing to confocal detection, high focal resolution can be attained that would otherwise only be feasible with expensive matrix sensors in the case of non-descanned detection. Beyond this, temporal fluctuations in the projecting wide field illumination, e.g. of the halogen lamp 29 or of the mercury vapor lamp 34 among other things, can be phased out by proper integration in the spacially resolving detector 28, 28a.

For this mode of operation of the laser scanning microscope 1, the primary color splitter 17 as well as the secondary color splitter 25 are naturally to be properly set. This also makes it possible, to simultaneously operate both types of illumination, that is to say, the wide field illumination from below and the illumination through the objective 21 when the color splitters are designed to be suitably dichroic. Also, random combinations with scanned illumination from the radiation source module 2 are possible. A corresponding overlaid graphic representation of the evaluated signals then offers image information that is outstanding when compared to conventional concepts.

The combination of a confocal line formation, that is to say, of a line scanner with multiple channel spectral detection makes it possible to acquire highly parallel data. An image recording rate of over 200 images per second can be achieved and an ability to render "real time" that has not been realized to date with laser scanning microscopes is a given. As an alternative, the laser scanning microscope 1 also enables highly sensitive detection of particularly weak signal intensities. Compared to a conventional confocal point scanning laser microscope, a signal to noise ratio is obtained that is improved by a factor of $\sqrt{n}$, for the same image recording time, for the same surface imaged in the specimen, for the same visual field and for the same laser performance per pixel and with "n" being designated as the number of pixels in the detector line. A value ranging from 500 to 2,000 is typical of this.

The beam source module 2 of the laser scanning microscope 1 fulfills the requirements necessary to this end, namely the illuminating line which is made available by the beam forming unit 16, which exhibits n-fold output, as well as the laser focus of a comparable confocal point scanner.

As an alternative, and by comparison to a confocal single point scanner, for the same image recording time and the same signal to noise ratio, the specimen exposure, that is to say the quantity of radiation the specimen shall be exposed to, can be lowered by a factor of "n" if the radiation output applied to date in a confocal point scanner is now limited to just being distributed on the line.

As compared to a confocal point scanner, the line sensing laser scanning microscope with the beam forming unit 16 therefore makes it possible, by a factor of n, to more quickly form low intensity signals from sensitive specimen substances with the same signal to noise ratio and the same specimen exposure, and to form a signal to noise ratio improved by a factor of $\sqrt{n}$ with the same recording time, or with the same recording time, with the same signal to noise ratio and with a specimen exposure that is lower by a factor of n.

Figure 2:
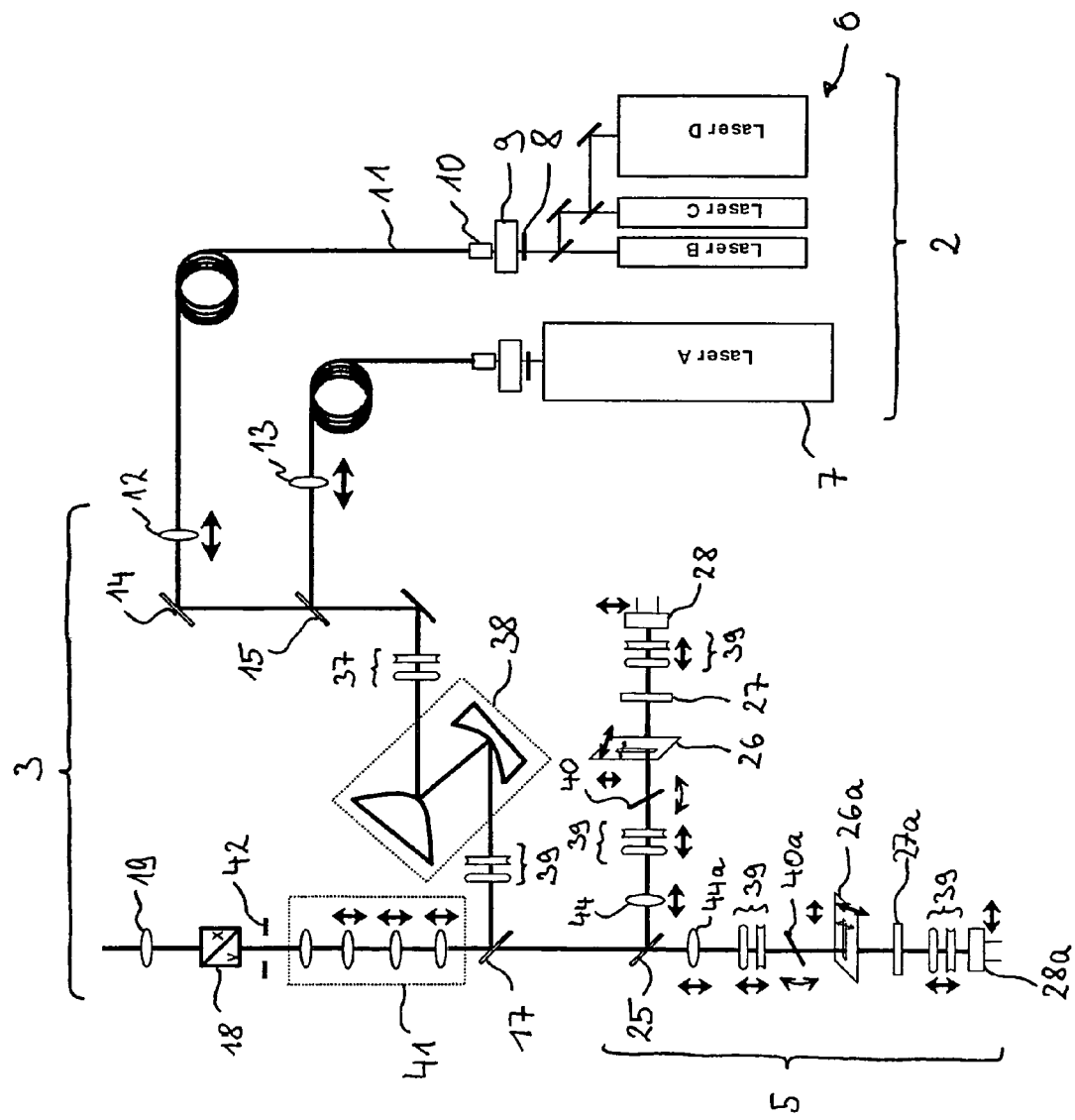
FIG. 2 a schematic representation of a radiation source module, of a scanning module as well as of a detector module for a laser scanning microscope, FIG. 3 a schematic representation of the beam path in an illuminating device of the laser scanning microscope in FIG. 2 in a first sectional plane, FIG. 4 the beam path from FIG. 3 in a second sectional plane arranged perpendicular to the first plane, FIG. 5 a computer representation of an aspheric mirror in which the beam path from FIGS. 3 and 4 is used, FIG. 6 a sectional representation through the aspheric mirror from FIG. 5 for clarifying the magnitudes characterizing this mirror, FIG. 7 an intensity profile attained with the beam path from FIGS. 1 and 2 in a sectional plane, FIG. 8 a schematic representation of a scanning module for the laser scanning microscope in FIG. 1 or 2, FIG. 9 a schematic representation to illustrate the need for corrections in the configuration of FIG. 8, FIG. 10 a schematic representation of a plane parallel plate in the configuration of FIG. 8, FIG. 11 a perspective representation of the plane parallel plate from FIG. 8 with a motor drive, FIGS. 12 through 15 additional forms of embodiment of a laser scanning microscope in representations similar to FIG. 2, FIG. 16 a schematic representation of a scanning module as well as of a detector module from a laser scanning microscope in representations similar to FIG. 2, FIG. 17 two schematic drawings for visualizing the mode of action of the detector module from FIG. 16.

FIG. 2 shows in detail a form of embodiment for a beam source module 2, a scan module 3 as well as for a detector module 5 for the laser scanning microscope 1. Construction components already appearing in FIG. 1 are designated with the same reference numbers in FIG. 2 which is why we refer at least in part to FIG. 1 for the description of FIG. 2.

In FIG. 2, it can be seen that the Gaussian bundles of rays present after the movable, that is to say, slidable collimators 12 and 13, are united by means of stepped mirrors in the form of beam uniting mirrors 14, 16 and after that, are converted into a bundle of rays with a rectangular cross sectional beam profile. In the simplest of cases for the beam forming unit 16 in FIG. 1, we are dealing with a cylindrical optical system. In the form of embodiment in FIG. 2 however, a cylinder telescope 37 is used, after which an aspherical unit 38 is arranged, followed by a cylindrical optical system 39. The mode of construction and function of the aspherical unit 37 shall now be detailed in the following based on FIGS. 3 through 7.

Figure 3:
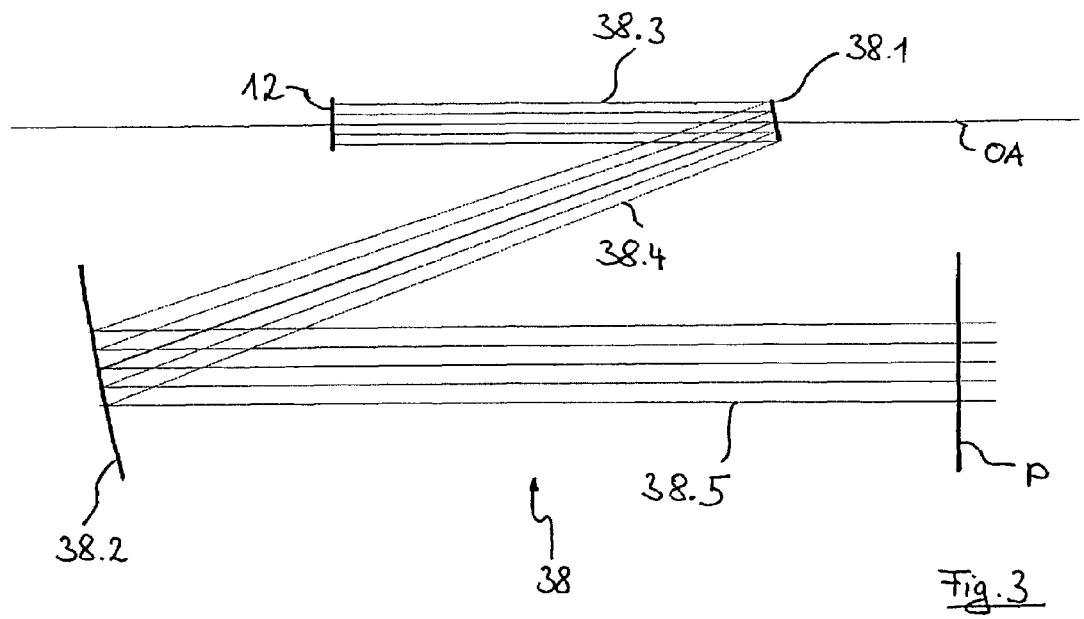
Figure 4:
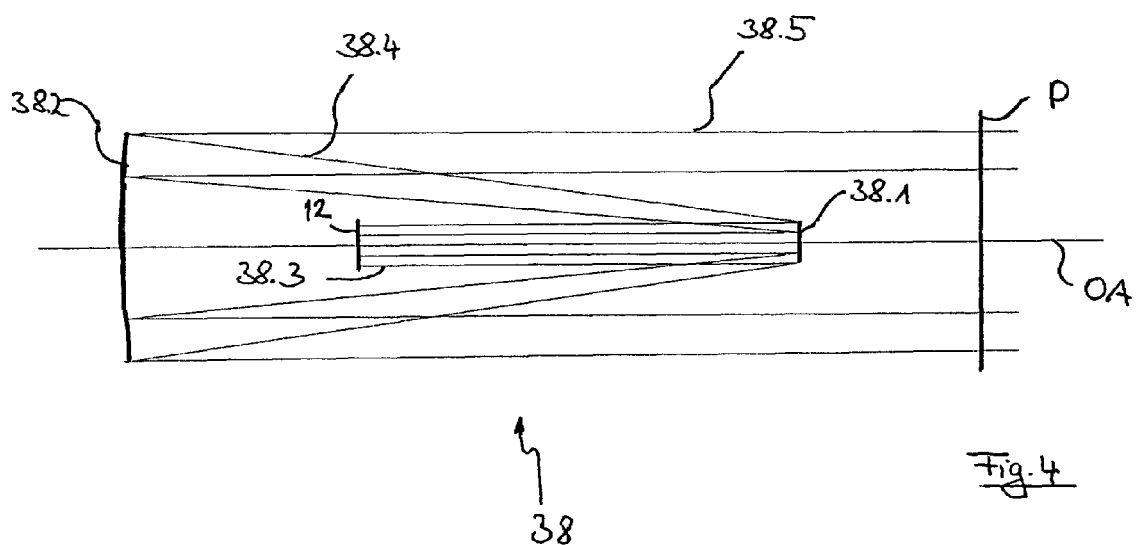

FIGS. 3 through 4 show an illuminating configuration with which the radiation from the beam sources can be reshaped in terms of the beam's profile. FIG. 3 is a section in a (z, x) plane; FIG. 4 is a section perpendicular to the latter in a (z, y) plane. Initially, a beam is present which is profiled to be Gaussian in any sectional direction perpendicular to the direction of propagation. After reshaping, a beam is produced on a profile plane P, which essentially illuminates a rectangular field, whereby the distribution of intensity along the longitudinal field axis is not Gaussian in shape, but rather box-shaped.

For reshaping the beam, an aspheric mirror 38.1 is used which expands the radiation. The expanded radiation is again made parallel by means of a concentrating reflector mirror 38.2. The aspheric mirror 38.1 is impinged by a source beam 38.3 from the beam source, said source beam exhibiting a rotationally symmetric Gaussian-shaped beam profile. In the section represented in FIG. 3, the aspheric mirror 38.1 is curved as per radius of curvature $r_x$, therefore being spherical in this plane. The aspheric component first comes to bear in the section represented in FIG. 4, yet to be detailed. Due to the sphericity of the aspheric mirror 38.1 along the x-axis, the diverging beam put out by the aspheric mirror 38.1 is expanded while retaining its Gaussian profile. The concentrating reflector mirror 38.2, which is also spherical in the sectional plane of FIG. 3, provides a profiled beam 38.5 which also has a Gaussian profile in the profile plane P of the sectional representation in FIG. 3. Naturally, should this expansion not be desired, one can also execute the aspheric mirror 38.1 and the concentrating reflector mirror 38.2 to be plane for the (z, x) plane.

FIG. 4 shows a section that is perpendicular to FIG. 3. In this plane, the aspheric mirror 38.1 is designed to be aspherical and the source beam 38.3 emitted by the beam source is transformed into a diverging beam 38.4 now redistributing the energy around. The aspheric mirror 38.1 reflects more and more beam output with the increase in angle to the optical axis OA, so that energy is propagated in the diverging beam 38.4 in the sectional representation of FIG. 2. The concentrating reflector mirror 2 concentrates the no-longer Gaussian-shaped diverging beam 4 in the sectional representation of FIG. 4 and renders the radiation parallel to a profiled beam 38.5. In this plane and as opposed to that in FIG. 3, a non-equidistant distribution of the fractional beams is therefore shown in FIG. 4, drawn-in for the sake of visualization.

Figure 5:
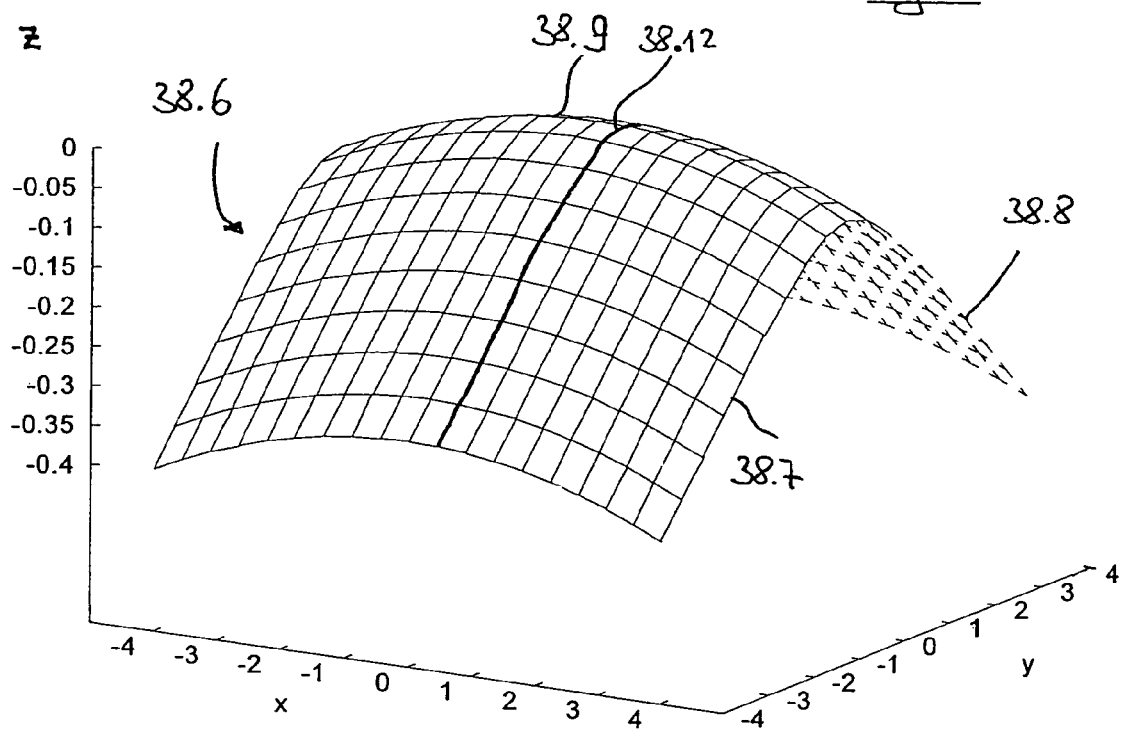

The action of the aspheric mirror 38.1 provided in FIGS. 3 and 4 also with a convex curvature can better be recognized if one observes its reflecting mirror surface 38.6 exemplarily represented in FIG. 5. The reflecting mirror surface 38.6 exhibits two top surfaces 38.7, 38.8, which coincide in a dome 38.9. At the same time, the reflecting mirror surface 38.6 along the x-axis is spherically curved (an optional characteristic, see above) as also becomes evident from the curve in the dome 38.9. The reflecting mirror surface 38.6 is therefore cone shaped in a (z, y) section (parallel to the y-axis) with a rounded off tip. In a section parallel to the x-axis ((z, x) section) in contrast, there is a spherical curvature. Naturally, instead of the spherical curvature along the x-axis, a plane formation can be used or an aspherical curvature just as well.

The aspherical curvature on the (z, y) plane effects the propagation of energy, as represented in FIG. 4, since due to the rounded off conical profile, just in the region of the tip, engendering increased angles along with the optical axis, there is an increase in the amounts of energy also being reflected. In contrast, the spherical curvature on the (z, x) plane causes the beam to expand while maintaining its profile, as represented in FIG. 3. The original, rotationally symmetrical Gaussian profile is thereby reshaped into a more or less rectangular profile. With the asphericity in both sectional planes, the field is homogenized in both sectional planes.

FIG. 6 shows a sectional line 38.12 of the reflecting mirror surface 38.6 in a (z, y) section, that is to say, in a section along the y-axis. The sectional line 38.12 is entered in the drawing not only for the sake of visualization in FIG. 6, but in FIG. 5 as well in the form of a thicker line. Its form is essentially determined by two geometric factors—on the one hand, by a parabola 38.10, which establishes the form of the rounded off tip/vertex of the sectional line 38.12, and on the other hand, by an asymptote 38.13, which defines the course of the sectional line 38.12 removed from the vertex 38.11. The parabola 38.10 can be defined for the vertex when the radius of curvature is provided. The asymptote 38.13 is established by a conic constant Q. For y-values approaching infinity, the sectional line 12 approaches the straight line $1/(Q \cdot c) + y/(1-(1+Q)^{1/2})$. The conic constant Q therefore determines the slope $1/(1-(1+Q))^{1/2}$ in the outer spherical region. The radius c defines the curvature in the region of the vertex 38.11. Overall, the sectional line is therefore defined by the equation: $y^2/[c+(c^2-(1+Q)y^2)^{1/2}]$ The asphericity detailed for the one sectional direction can naturally also be provided in the other sectional direction. One can therewith achieve a homogeneously illuminated elliptical or round shaped field; said round shaped field being achieved with a rotationally symmetrical aspheric mirror 38.1. As an alternative, one can omit the sphericity in the x-direction. The aspheric mirror 38.1 would then have the profile form of the sectional line 38.12 for each respective x-coordinate.

The reflecting mirror surface represented in FIG. 5 has a radius of curvature c=10 mm, a conic constant Q=−100 as well as a radius of curvature along the x-axis of $r_x$=100 mm. Normally, the $r_x$ parameter shall be selected to be rather much greater than the diameter of the source beam 38.3

FIG. 7 shows a profile 38.14 of the intensity "I" represented as being nearly evenly distributed in the profile plane as represented along the y-axis. As can be seen, in 80% of the illuminated region, the radiation intensity lies at over 80% of the maximum value; it is therefore essentially homogenous. The profile 38.14 is more or less box-shaped. In any case, it much more approximates a rectangle than it does the originally presented Gaussian profile. In the case of asphericity in both spatial directions, the radius of an illuminated field would be entered instead of the "y" in FIG. 7.

The convex or concave reflecting mirror surface 38.6 of the aspheric mirror 38.1 can be produced in a variety of manners. Thus, the profile corresponding to the sectional line 38.12 can be integrated into a cylinder that has a radius of curvature which corresponds to the radius of curvature $r_x$ of the reflecting mirror surface in the (z, x) plane. If one wishes to obtain a reflecting mirror surface 38.6 that is not curved in the (z, x) plane, that is to say, whose radius of curvature in this sectional plane can be assumed to be infinite, then the arrangement can be done with a quadrangular prism or a wedge which would then be rounded off in the region of the dome, corresponding to the curvature "c" dictated by the parabola 38.10. In the case of $r_x$-radii being smaller than 0, then replica techniques or duplicating techniques can be used to form the reflecting mirror surface 38.6 of the aspheric mirror 38.1.

For creating the shaped beam 38.5, a concentrating reflecting mirror 38.2 is positioned after the aspheric mirror 38.1, as shown in FIGS. 3 and 4. Said mirror is designed, for example, as a toric mirror with radii of curvature $r_{fx}$ and $r_{fy}$ and renders the diverging beam 38.4 parallel. The diverging beam 38.4 is hereby made to disperse based on the spherical curvature (in the (z, x) plane) of the aspheric mirror 38.1 as well as by the aspheric profile in accordance with the sectional line 38.12. For collimating the diverging beam 38.4, the concentrating reflecting mirror 38.2 is therefore purposefully designed as a toric mirror with different radii of curvature $r_{fx}$ and $r_{fy}$. The first mentioned divergence sets the height of the rectangular field to be illuminated by the shaped beam 38.5, and the second mentioned divergence causes the expansion along the extended latitude.

In order to especially simplify the implementation of the setting for the height of the rectangular field to be illuminated, the radius $r_{fx}$ is selected as $r_{fx}+2 \cdot d$ for the toric mirror, wherein "d" designates the distance between the aspheric mirror 38.1 and the concentrating reflecting mirror 38.2 on the optical axis. One then obtains a beam expansion factor of $r_{fx}/r_x$ and therefore about $1+2d/r_x$.

Instead of the concentrating reflecting mirror 38.2, one can naturally also use a corresponding achromatic toric lens. Furthermore, at least one cylindrical mirror can be used for correcting the modified ray bundle diameter transverse to the homogenized direction, said cylindrical mirror having such dimensions that, together with the radius $r_x$ of the aspheric mirror 38.1 as well as with the radius $r_{fx}$ of the concentrating reflecting mirror 38.2, it can purposefully change the focus and the ray bundle diameter transverse to the homogenized direction. This cylindrical mirror can be positioned in front of the aspheric mirror 38.1 or after the toric concentrating reflecting mirror 38.2. Its function can also be realized by at least one achromatic cylindrical lens.

The illuminating configuration with the aspheric mirror 38.1 can serve to evenly fill in a pupil between a tube lens and an objective. The optical resolution of the objective can be fully exploited by so doing. This variant is purposeful in a point scanning or in a line scanning microscope system (in the latter case, in addition to the axis in which the specimen is being focused on or in).

As explained, the linearly transformed excitation radiation is directed to the primary color splitter 17. In a preferred form of embodiment, the latter is designed as a spectrally neutral splitter mirror in accordance with the German patent DE 10257237 A1, whose revealed contents are fully integrated here. The concept of "color splitter" also includes splitter systems that act in a non-spectral manner. Instead of the described spectrally independent color splitter, an homogenous neutral splitter (e.g. 50/50, 70/30, 80/20 or such similar) or a dichroic splitter can also be used. In order to make an application based selection possible, the primary color splitter is preferably equipped with mechanics that make it possible to implement a simple change, for example, by means of a corresponding splitter disc which contains individual, interchangeable splitters.

A dichroic primary color splitter is especially advantageous in the case when coherent, that is to say, when oriented radiation is to be detected such as, for example, reflection, Stoke's or anti-Stoke's Raman spectroscopy, coherent Raman processes of the higher order, general parametric non-linear optical processes, such as second harmonic generation, third harmonic generation, sum frequency generation, two photon absorption and multiple photon absorption or fluorescence. Several of these processes from non-linear optical spectroscopy require the use of two or more laser beams that are co-linearly superimposed. To this end, the described unification of beams from several lasers proves to be especially advantageous.

Basically, the dichroic beam splitters widely used in fluorescence microscopy can be applied. It is also advantageous for Raman spectroscopy to use holographic notch splitters or filters in front of the detectors to suppress Rayleigh scattering.

It is advantageously shown in FIGS. 2, 12, 14 and 15 that the excitation radiation or the illuminating radiation is directed to the scanner 18 by way of a motor driven optical zoom system 41. With this, the zoom factor can be adjusted and the scanned visual field is continuously variable within a specific positional region. Especially advantageous is an optical zoom system in which the position of the pupil is maintained throughout the continuous tuning process when the focal position and the image dimensions are being adjusted. The three degrees of freedom for the optical zoom system 41, represented, for example, in FIG. 2 and symbolized by the arrows, exactly correspond to the number of degrees of freedom provided for the adaptation of the three parameters, namely image dimensions, focal position and pupil position. Especially advantageous is an optical zoom system 41 with a pupil on whose exit face a stationary aperture 42 is arranged. In a simple and practical embodiment, the aperture 42 can also be provided by delimiting the reflecting mirror surface of the scanner 18. The exit face aperture 42 with the optical zoom system 41 ensures that there is always a fixed pupil diameter formed on the scanning objective 19 regardless of the changes made on zoom magnification. This allows the objective's pupil to remain fully illuminated even during arbitrary changes made on the setting of the optical zoom system 41. The use of an independent aperture 42 advantageously prevents the incidence of unwanted stray radiation in the range of the scanner 18.

The cylindrical telescope 37 working together with the optical zoom system 41 is also activatable by a motor and is arranged in front of the aspherical unit 38. It is selected in the form of embodiment represented in FIG. 2 to have a compact setup, but this need not be the case.

If a zoom factor of less than 1.0 is desired, the cylindrical telescope 37 is automated to pivot into the optical path of the beam. This prevents the aperture diaphragm 42 from being incompletely illuminated when the zoom objective 41 setting is scaled down. The pivotable cylindrical telescope 37 thereby ensures that even with zoom factor settings of less than 1, that is to say, independent of any adjustment change in the optical zoom system 41, there will always be an illuminated line that is constant in length on the site of the objective's pupil. As compared to a simple visual field zoom, losses in the laser's output as expressed in illuminating beam power are avoided owing to this.

Since an image brightness jump cannot be avoided in the illumination line when the cylindrical telescope 37 is being pivoted, it is provided in the (non-represented) control unit, that the feed rate of the scanner 18 or the gain factor for the detectors in the detector module 5 is adapted accordingly when the cylindrical telescope 37 is activated so that the image brightness can be maintained at a constant.

Figure 18:
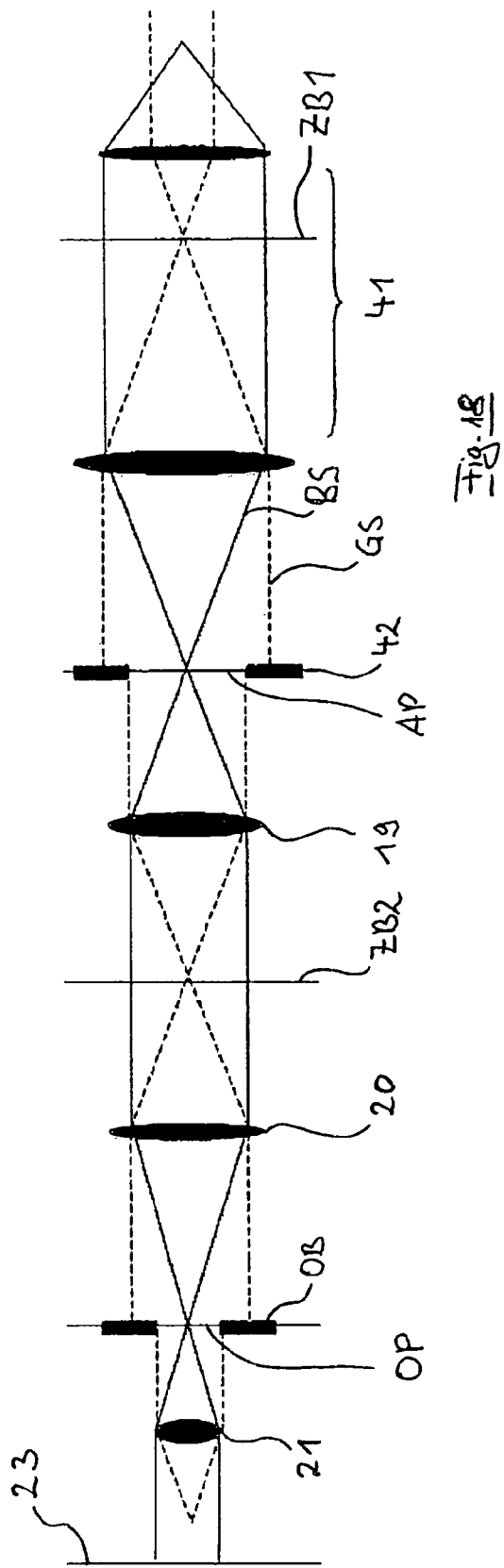
FIG. 18 a schematic representation of the beam path between an optical zoom system provided in the laser scanning microscope from FIG. 2 and the specimen detected by the laser scanning microscope, FIG. 19 a curve for the visualization of diameters of pupils in the setup according to FIG. 18, FIGS. 20a, 20b and 21a, 21b as well as 22a, 22b different settings for the optical zoom system in FIG. 2, whereby the figures designated with "b" show a sectional representation, which is rotated by 90° as compared to those figures designated with "a", FIG. 23 a diagram with the positional adjustment of the four optical groups in the optical zoom system from FIGS. 20 through 22 in a first mode of operation with constant imaging length, FIG. 24 a diagram with the setting of the four optical groups for a second mode of operation with constant magnification, FIG. 25 a representation similar to FIGS. 23 and 24, however, for a mode of operation with simultaneous variation of imaging length and magnification, FIG. 26 a schematic representation of a scan field for the visualization of possible zoom effects, FIG. 27 a schematic representation of a laser scanning microscope with a Nipkow disc, FIG. 28 a schematic representation of a laser scanning microscope with parallel multiple point illumination and scanning.

FIG. 18 schematically shows a possible form of embodiment for the beam path in FIG. 1 between the primary color splitter 17 and a specimen 23 arranged in the microscope module 4. The optical zoom system 41, which is only depicted in FIG. 19 as comprised of two elements for the sake of simplification, effects a pupil image in the illumination beam path IB [BS]. At the same time in the object beam path OB [GS], designated by the dashed line in FIG. 18, an intermediate image II 1 [ZB1] is formed in the optical zoom system 41. The optical zoom system focuses from infinite to infinite. The exit pupil Ex.P [AP] of the optical zoom system 41 is purposefully circumscribed by the aperture 42, as previously mentioned, so that independent of any setting adjustments on zoom magnification, there is always a fixed pupil diameter on the subsequently arranged scanning objective 19. In the microscope module 4, between the tube lens 20 and the objective 21, in the objective's pupil OP, is arranged an objective aperture OA [OB] which is filled by or even completely illuminated by the exit pupil Ex.P [AP]. Owing to this, the maximum objective resolution can be achieved.

Figure 19:
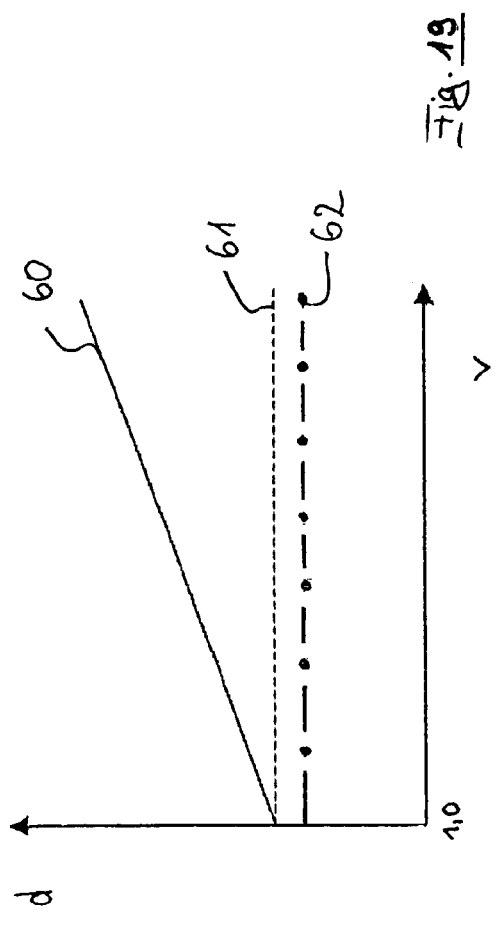

FIG. 19 shows the action of the aperture 42 for filling the objective's pupil OP [OP]. The pupil diameter d is entered, in reference to this, on the vertical axis, and on the horizontal axis, the magnification m [v] effected by the optical zoom system 41 is entered. Curve 60 is the function according to which the pupil diameter would change without the aperture 42. The dashed line 61 shows the pupil diameter according to the aperture 42 in dependency on magnification m [v]. Finally, the dashed-dotted line 62 visualizes the course of the pupil diameter of the objective's pupil OP [OP]. As can be seen, by virtue of the objective aperture OA [OB], which is smaller than the aperture 42, the objective's pupil is independent of magnification m [v]. Naturally, the objective aperture OA [OB] can also be designed with corresponding mountings in the objective 21; but it need not be a separate component.

The FIGS. 20a/b, 21a/b as well as 22a/b show different settings for the zoom objective 41, whereby said representation is inverted as compared to that in FIG. 19, that is to say, the direction of illumination runs from left to right in FIGS. 20 through 22. Furthermore, for the sake of simplification, the scanner 18 is not depicted in FIGS. 20 through 22, nor in FIG. 19 as well. As can be seen in the exemplary mode of construction shown, the zoom objective is comprised of four optical groups G1 through G4, whereby group G1 has positive refracting power and is stationarily secured. The second group G2 has negative refracting power and is moved together with groups G3 and G4 which once again have positive refracting power. The movement is effected in such a manner that focusing from infinite to infinite is maintained and magnification and pupil position are to be set, depending on the mode of operation.

Furthermore, in an exemplary variant it is purposeful to design group G1 as one unit together with the scanning objective following it; in this variant, the scanning objective is therefore positioned before the scanner in the direction of illumination (not shown).

Each group is comprised of at least one lens. To satisfy the requirements for the desired spectral ranges as well as for the targeted aperture/field angle, the groups are self-correcting, to the extent possible, in terms of imaging errors/image defects.

Figure 23:
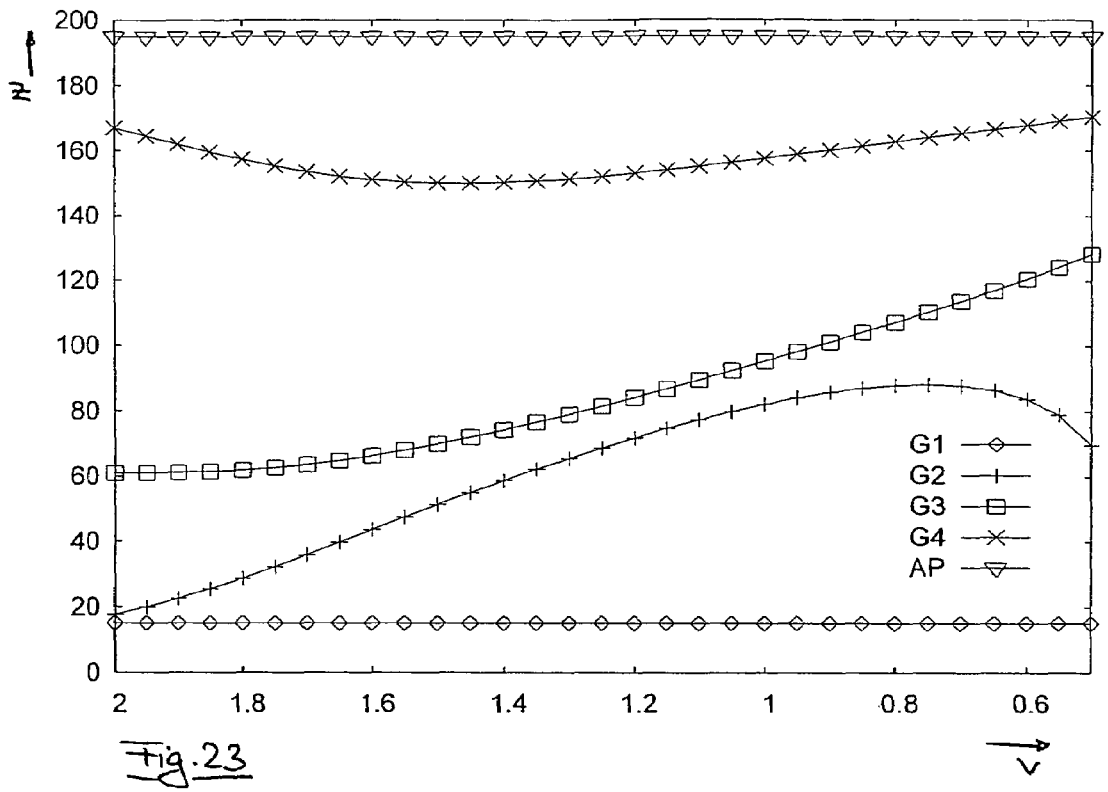
Figure 24:
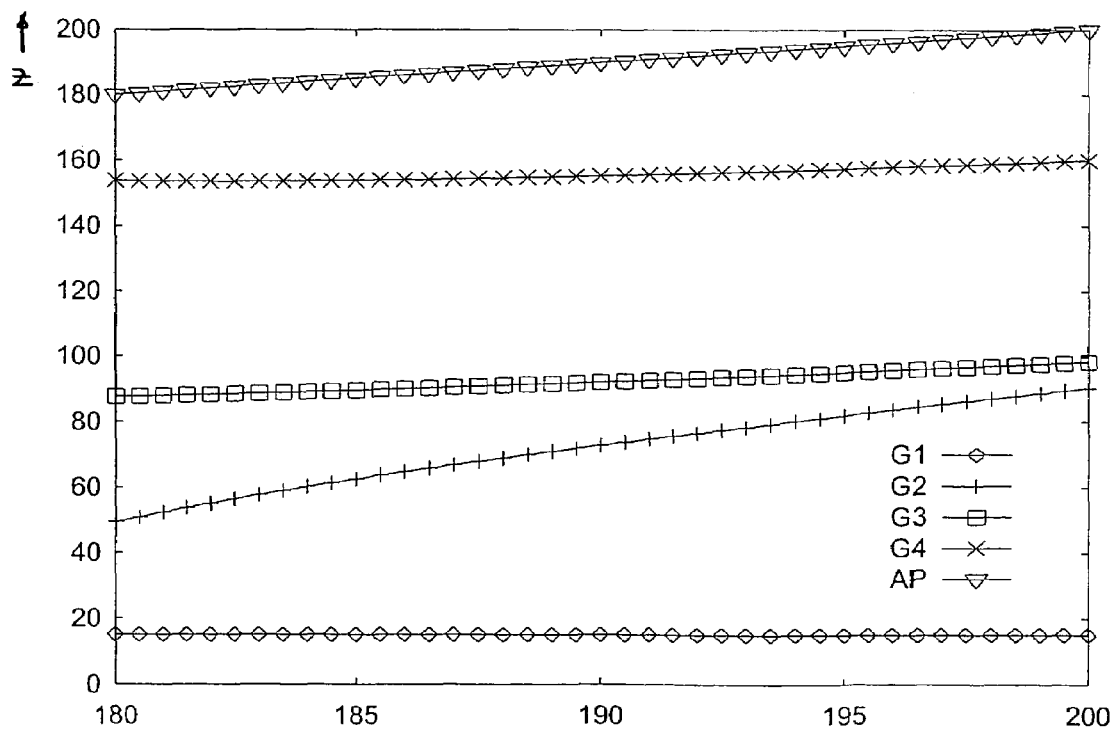
Figure 25:
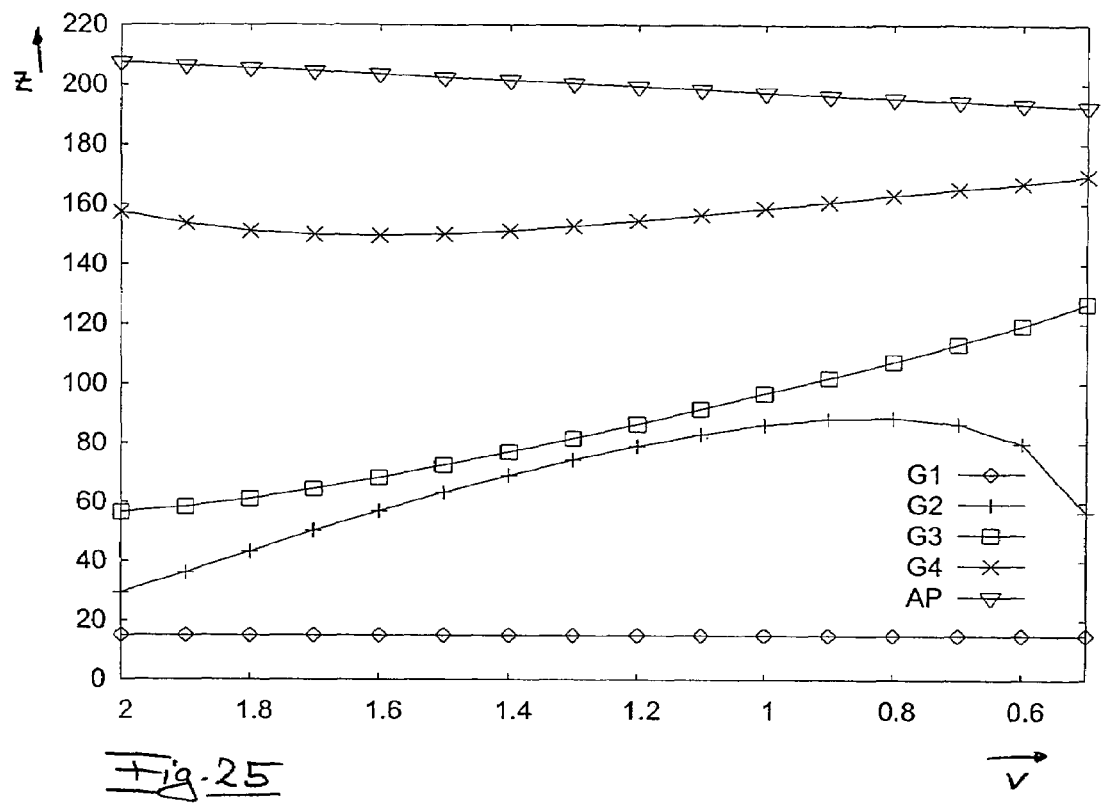

FIGS. 23 through 25 schematically and exemplarily show the optical movement of the zoom lens systems in the groups G1 through G4, whereby the focal distances are as follows: focal distance of G1, 45 mm; focal distance of G2, 153 mm; focal distance of G3, 45 mm; focal distance of G4, 89 mm. The focal distances are scaled to the transmittance length L.

For the sake of visualization in FIGS. 23 through 25, the position of the exit pupil Ex.P [AP] is also drawn in as well as that of the entrance pupil En.P [EP]. The transmittance length L is defined as the distance between the entrance pupil EnP [EP] and the exit pupil Ex.P [AP]. Furthermore, in FIG. 20a, the z-coordinate, which is measured along the optical axis, is entered for the four groups G1 through G4. The entrance pupil is hereby set to the 0 position.

The figures designated with "a" respectively show a sectional plane which is rotated by 90° as compared to the figures designated with "b". Thus, FIGS. 20a, 21a and 22a contain the pupil beam path and FIGS. 20b, 21b and 22b contain the object beam path. Based on the confocal slit aperture configuration with linear illumination used in the exemplary embodiment, a line is always present in the object beam path in those cases when there is a pupil in the pupil beam path, or when there is a nodal point as in FIGS. 20a, 21a, 22a. In another type of confocal imaging (for example with a Nipkow disc, multiple spot scanner, single spot scanner) the setup conditions are naturally different.

In FIGS. 21a/b, a magnification factor of m [v]=1.4 is set, whereas the setting in FIGS. 22a/b effects a magnification of m [v]=2.0 with the same imaging length. As compared to the imaging lengths in FIGS. 21 and 22, the imaging length has been extended by 10 mm for the setting in FIGS. 20a/b with the same magnification factor as in FIGS. 21a/b. The position of the exit pupil Ex.P. [AP] drawn into the figures clearly demonstrates this.

The zoom objective 41 can therefore be operated in two different modes of operation. On the one hand, it is possible to change the setting for magnification m [v] while maintaining a constant imaging length L. A change from the position drawn in FIGS. 21a/b to the position in accordance with FIGS. 22a/b represents, for example, an operation in the first mode of operation which produces a scanning field zoom. The settings possible for this in groups G2 through G4 can be seen in FIG. 23 in which the coordinates of the groups G1 through G4 are entered along the z-axis, as represented in FIG. 20a, as a function of magnification m [v].

The concept of "magnification" once more relates to the action of the optical zoom system, that is to say, to the magnification of the image. An image magnification is then attained when the optical zoom system, in the direction of illumination, has indeed achieved a reduction of the image transmitted by the illumination source, that is to say, for example, when a focal line has been shortened. In contrast, in the direction counter to illumination, that is to say, in the direction of detection, an enlargement takes place.

FIG. 24 shows a second mode of operation which changes the transmission length while maintaining constant magnification. Since the transmittance takes place in millimeters along the z-axis, one can clearly see that the transmittance length can be varied, for example, by up to 20 mm, when the setting on the optical zoom system is changed. The position of the exit pupil Ex.P. [AP] shifts from 180 to 200 mm as compared to the position of the entrance pupil (situated at 0 mm). The values in the figure relate to a change in the transmittance length at a magnification factor of 1.0.

FIG. 25 shows a mode of operation which is comprised of a combination of the above-mentioned first mode of operation (FIG. 23) and of the second mode of operation (FIG. 24). With the shown control of the optical groups G2 through G4 (once again, the setting on the optical group G1 is not changed), the magnification m [v] is simultaneously varied with the transmittance length L (the latter comes as a result of the change in position of the exit pupil in FIG. 25).

FIG. 20 shows how a region of interest (ROI) can be selected by means of the optical zoom system 41 within the maximum scan field SF made available. If the control setting on the scanner 18 is left such that the amplitude does not change, for example, as is forcibly required of resonance scanners, a magnification setting greater than 1.0 on the optical zoom system has the effect of narrowing in the selected region of interest (ROI) centered around the optical axis of the scan field SF. If the scanner is manipulated in such a manner that it scans a field asymmetrically to the optical axis, that is to say, in the resting position of the scanner mirrors, then one obtains an offset shift OF in the selected region of interest (ROI) in association with the zooming action. This is also referred to as a "crop" function.

Based on the previously mentioned action of the scanner 18 to descan and based on a repeat run through the optical zoom system 41, the selection of the region of interest (ROI) in the detection beam path is again cleared in the direction toward the detector. One can hereby make any selection for the desired region of interest (ROI) within the range offered by the scanning image SF. In addition, for different selections within the region of interest (ROI), one can acquire images and then compose them into an image that is highly resolved.

If one not only wishes to shift the selected region of interest by the measure of an offset OF relative to the optical axis, but also wishes to rotate said region, there is a purposeful form of embodiment which provides an Abbe König prism in a pupil of the beam path between the primary color splitter 17 and the specimen 23, which obviously leads to the rotation in the image field. This image is also cleared again in the direction of the detector. Now, one can measure images with different offset spacings OF and with different angles of rotation and after that, they can be computed into a high resolution image, for example, by means of an algorithm, as described in the publication by M. Gustafsson, "Doubling the lateral resolution of wide-field fluorescence microscopy using structured illumination" in "Three-dimensional and multidimensional microscopy: Image acquisition processing VII", Proceedings of SPIE, Vol. 3919 (2000), p 141-150.

In addition to the motor driven optical zoom system 41 as well as to the motor activated cylindrical telescope 37, there are also remote controlled adjusting elements provided in the detector module 5 of the laser scanning microscope in FIG. 2. To compensate for lateral color errors, for example, a circular optical system 44 as well as a cylindrical optical system 39 are provided in front of the slit aperture, and directly before the detector 28, a cylindrical optical system 39 is provided, each of which is respectively driven by a motor so as to slide in the axial direction.

Additionally provided for the sake of compensation is a correcting unit 40 which shall be described in the following based on FIGS. 8 through 11.

Figure 8:
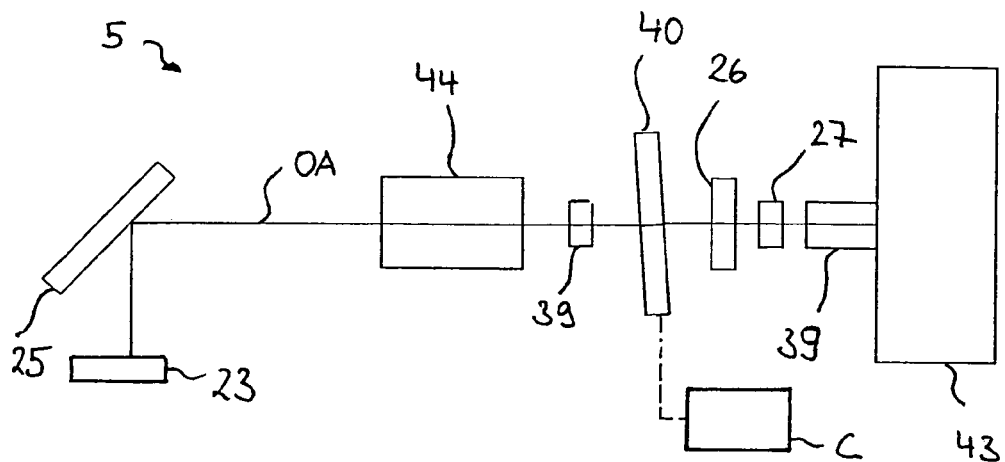
Figure 9:
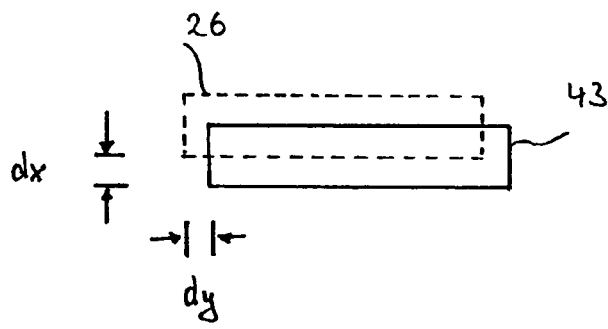

FIG. 8 schematically shows a form of embodiment for the detector module 5 of the laser scanning microscope 1. It shows a CCD line 43 as a detector 28, which is integrated via the color splitter 25 in the beam path of the laser scanning microscope. The color splitter 25 is interchangeable so as to enable detection of radiation with different wave length ranges. The flexibility based on the interchangeability of the color splitters applies both to the excitation radiation used in the scanning microscope as well as to the (fluorescent) radiation to be detected.

The CCD line 43 receives radiation via the color splitter 25 which then by way of the slit aperture 26 that acts as a confocal aperture becomes incident on CCD line 43.

Together with a circular lens 44 arranged in front of the slit aperture as well as with the equally prepositioned first cylindrical optical system 39 as well as with the postpositioned second cylindrical optical system, the slit aperture 26 forms a pinhole objective of the detector configuration 5, whereby the pinhole is realized here by the slit aperture 26.

The linear or line-shaped region of the specimen 23 illuminated for the purpose of generating fluorescent excitation which is confocally formed is schematically represented in FIG. 8. In order to avoid the unsolicited detection of excitation radiation that is reflected into the system at the level of the CCD line 43, a blocking filter 27 is additionally connected ahead of the second cylindrical lens 39, said blocking filter comprising spectral characteristics proper to letting accede solely the desired fluorescent radiation to the CCD line 43.

A change in the color splitter 25 or in the blocking filter 27 unavoidably causes a certain tilt or wedge error during pivoting. The color splitter can cause an error between the specimen region and the slit aperture 26; the blocking filter 27 can cause an error between the slit aperture 26 and the CCD line 43. To avoid the necessary readjustment of the position of the slit aperture 26 or of the CCD line 43, the plane parallel plate 40 is arranged between the circular optical system 44 and the slit aperture 26, that is to say, in the imaging beam path between the specimens 23 and the CCD line 43 so that said plate can be brought into various rocking positions by the activation of a controller C. The plane parallel plate 40 is adjustably mounted in a holding fixture (not represented in FIG. 8) suited to this end that shall later be detailed based on FIG. 11.

The plane parallel plate 40 causes a parallel offset which is drawn in FIG. 8 as a slight offset from the optical axis OA. This parallel offset is also to be seen schematically in FIG. 10 and applies to a form of embodiment (to be detailed later) with a two component plane parallel plate 40. The bundle of rays E incident upon the plate 40 crosswise to the plate surface emerges as an offset bundle of rays A. Without the plane parallel plate 40, the emergent beam drawn in with dashed lines in FIG. 10 would result.

A change in the tilt position of the plane parallel plate 40 makes it possible to adjust the position of the specimen line in such a manner vis a vis the slit aperture 26 (as an alternative, this also applies to the position of the aperture vis a vis the CCD line 43 also acting as an aperture if the plate 40 is inserted after the slit aperture 26) that, for a given set of conditions in the beam path subject to being modified when the color splitter 25 is changed, an optimal position will always result, that is to say, a biaxial centered position. This is visualized in FIG. 9, which in a top view shows the projection of the slit aperture 26 on the specimen line 23. As can be seen, based on a tilting error or wedge error, which, for example, can be caused by the color splitter 17 or 25, or the blocking filter 27, an offset dx is created in the x-direction, as well as an offset dy in the y-direction between the slit aperture 26 and the specimen line 23.

The offset dx leads to the result that the signal to noise ratio is unnecessarily compromised. If one wishes to improve the depth resolution in the confocal microscope by dimming the slit aperture 26, that is to say, by reducing its latitude in the x-direction, it can happen, in the case of an offset dx, which is greater than half the height of the specimen line 23, that there is no longer any incident radiation upon the CCD-line. The offset dx then leads to the outcome that the depth resolution attainable with the laser scanning microscope becomes lesser than should be the case accomplished with said equipment. The same applies to the possible alternate or cumulative variant for adjusting the slit aperture 26 and the CCD-line 23.

The optical adjustment of the specimen spot image attained for the slit aperture 26 by setting the tilting position of the plane parallel plate 40 has the effect that, seen in the x-direction, no surface area of the CCD-line 43 unnecessarily fails to be illuminated.

In contrast, the offset dy has the effect, in the y-direction, that the regional information detected by the CCD-line 43 does not correspond to the real conditions of emission and reflection in the specimen 23. Artifacts can result in the image (or a substitute image). The setting of the tilting position of the plate 40 makes it possible to minimize the offset dy, preferably to even bring it to 0, so that the slit aperture 26 lies in dead center on the CCD-line 43 and all pixels in the CCD-line 43 are correctly illuminated. This is especially important in the case when the laser scanning microscope is comprised of several detector channels which read out different color channels via the secondary color splitter 25. Since based on the individual adjustments of the settings, there would otherwise be different offsets of dy, this would lead to an error in the reconstituted image for such a multiple channel laser scanning microscope given the configuration of the individual color channels.

Depending on the wave length or the wave length range, which is evaluated in the detector module 5, the pinhole objective can display a chromatic cross-aberration that is variable. The same is true for elements prepositionally connected, for example, the color splitter 17, 25 or other optical systems configured on the optical axis OA. By setting the tilting position of the plate 40, this chromatic cross aberration can be compensated purposefully. To this end, the controller C guides the plate 40 into the tilt position, whereby each wave length range or each wave length is assigned its own tilt position for which the detector module 5 can be used.

Figure 10:
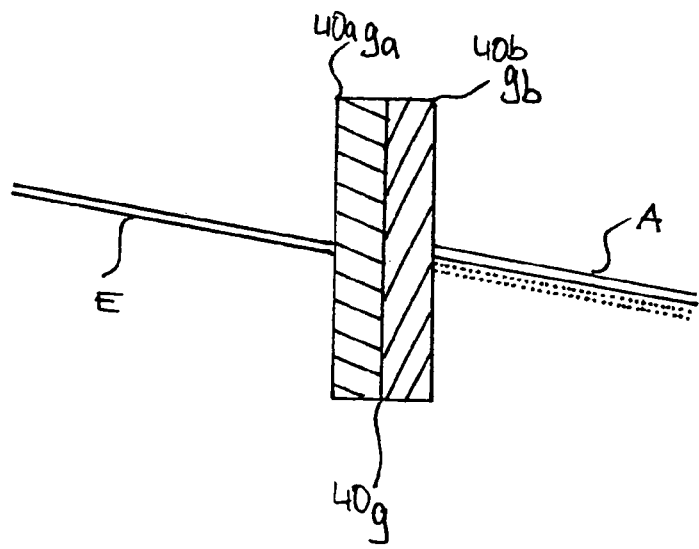

If relatively broad band radiation is being conducted in the detector channel, then the plane parallel plate itself can generate a chromatic cross aberration if the dispersion of the transparent material of the plane parallel plate 40 is such that the wave length dependent offset for the emergent bundle of rays A is different from that of the incident bundle of rays E. The mode of construction for the plane parallel plate 40, comprised of two graduated plates 40a, 40b, represented in FIG. 10, is provided in a form of embodiment to compensate for this. The materials for said graduated plates 40a, 40b can vary and they can be selected in such a manner that the chromatic cross aberrations, in the given wave length range, caused by dispersion will best possibly be eliminated. For example, the graduated plate 40a for shorter wave lengths causes a greater offset than the graduated plate 40b; the opposite is true for longer wave lengths. Owing to this, compensation for the chromatic cross aberrations of the plane parallel [plate] 40 is achieved. To generate a parallel offset that is independent of the color or that is purposefully dependent on the color, two separate tiltable plates with opposite running deflection and composed of materials with different dispersion are used.

The controller C sets the tilt position of the plate 40 based on input user specifications after evaluating the current configuration (in particular, also considering ambient temperature or device temperature or other external factors of influence) of the laser scanning microscope or does so continuously or at intermittent intervals within the process control cycles. The tilt position of the plate 40 is used as a correcting variable for control. In a calibrating step, the radiation intensity or the image offset on the CCD-line 43 can be analyzed as a controlled variable.

Figure 11:
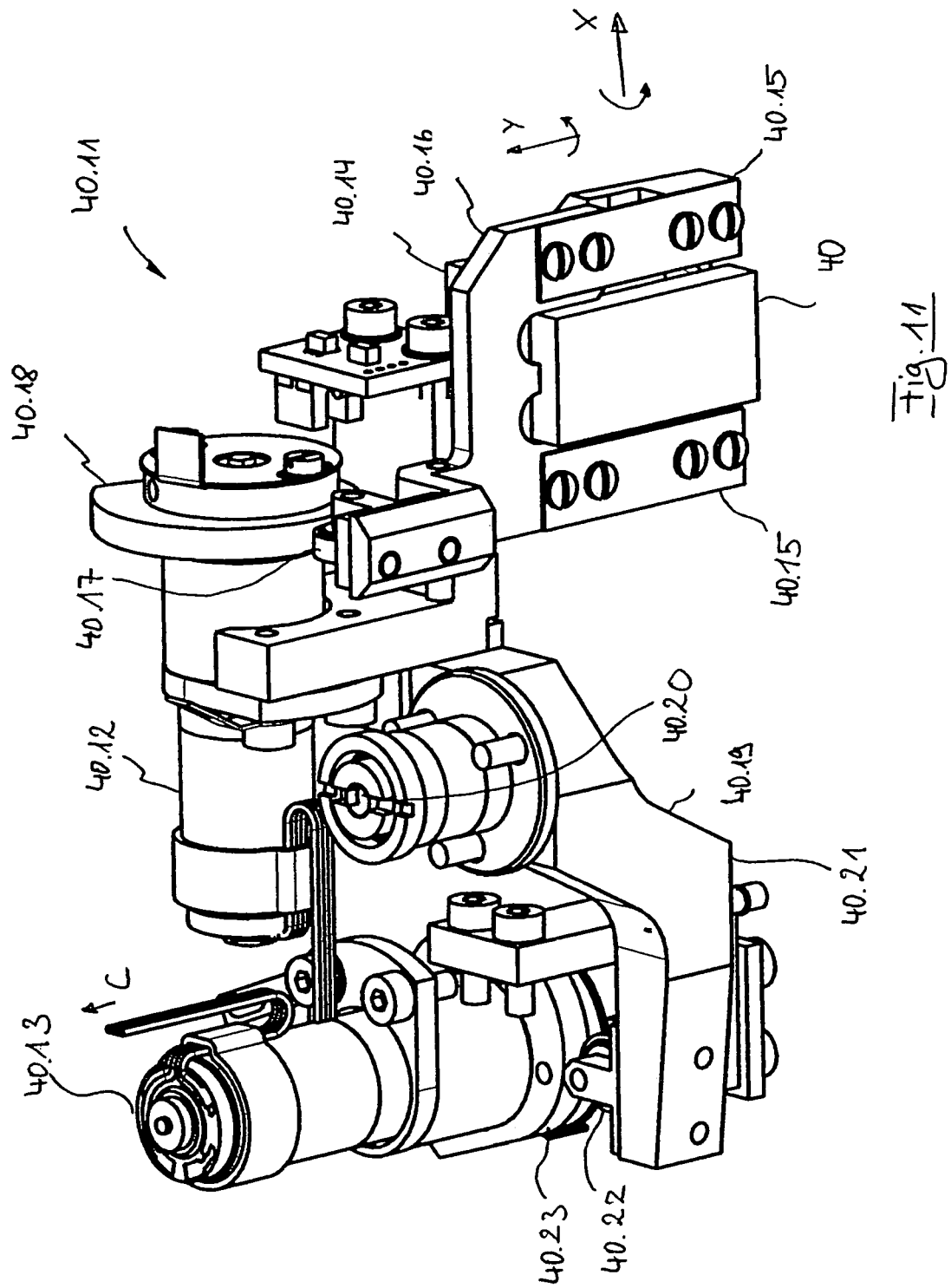

The drive 40.11 controlled by the controller C is represented in perspective in FIG. 11. As can be seen, the position of the plane parallel plate 40 can be changed by means of two motors 40.12, 40.13 for the x-axis or the y-axis. Positioning for the x-axis consists of a tilt movement with a rotational axis in the center of the plate 40. Rotation around the y-axis consists in a pivoting movement around an axis located outside of the plate.

A holding plate 40.14 is provided for tilting around the x-axis to which a pair of leaf springs 40.15 are screwed down which secure a frame 40.16 in which the plane parallel plate 40 is mounted. The leaf springs 40.15 establish the tilting axis. They press a roller 40.17 that is secured to a frame 40.16 on a cam disc 40.18, which is driven by a stepping motor 40.12, which is also seated on the holding plate 40.14. Depending on the position of the cam disc 40.18, the roller 40.17 and with it the frame 40.16 are thereby made to deflect in different positions whereby tilting of the plate 40 is achieved around the x-axis.

The holding plate 40.14 itself is the arm of a lever 40.19 which is rotatable around a swivel axis 40.20. The swivel axis 40.20 represents the axis for the movement of the plate 40 around the y-plane. The other arm 40.21 of the lever 40.19 carries on its end a roller 40.22 which rests against a cam disc

40.23, which is driven by the stepped motor 40.13. Similar to the manner in which the leaf springs 40.15 press the roller 40.17 against the cam disc 40.18, there is a spring element provided on the swivel axis 40.20 which presses the roller 40.22 against the cam disc 40.23.

By controlling the stepped motors 40.12, 40.13, the controller C, which is connected to the stepped motors by lines that are not represented here, can set the tilting or the pivoting position of the plane parallel plate 40 in the beam path of the detector configuration by motor power. Based on the incremental control of the stepped motors 40.12, 40.13 and in combination with the startup reference position assumed at the beginning of each operation, the controller C knows the actual position of the plate 40 at any point of the operation so that the position of the plate 40 can be used as a correcting variable in a regulating loop or it can be set depending on the stored input settings.

As an alternative to biaxial positioning, two adjustable uniaxial plates can also be connected one behind the other as exemplarily shown in FIG. 11.

In addition to positioning by means of the correcting unit 40 or 40*a*, the slit aperture 26, 26*a* itself can be made to change its setting. This specifically occurs to thereby match the width of the slit aperture 26, 26*a* to the airy diameter on the detector. By changing the width setting of the slit on the slit aperture 26 or 26*a*, the depth of field and thereby discrimination of sectional depth in the z-direction is set, that is to say, along the optical axis in the specimen 23. An additional cross displacement movement serves for roughly adjusting the region outside of the adjustment range of the correcting unit 40 or 40*a*.

Figure 12:
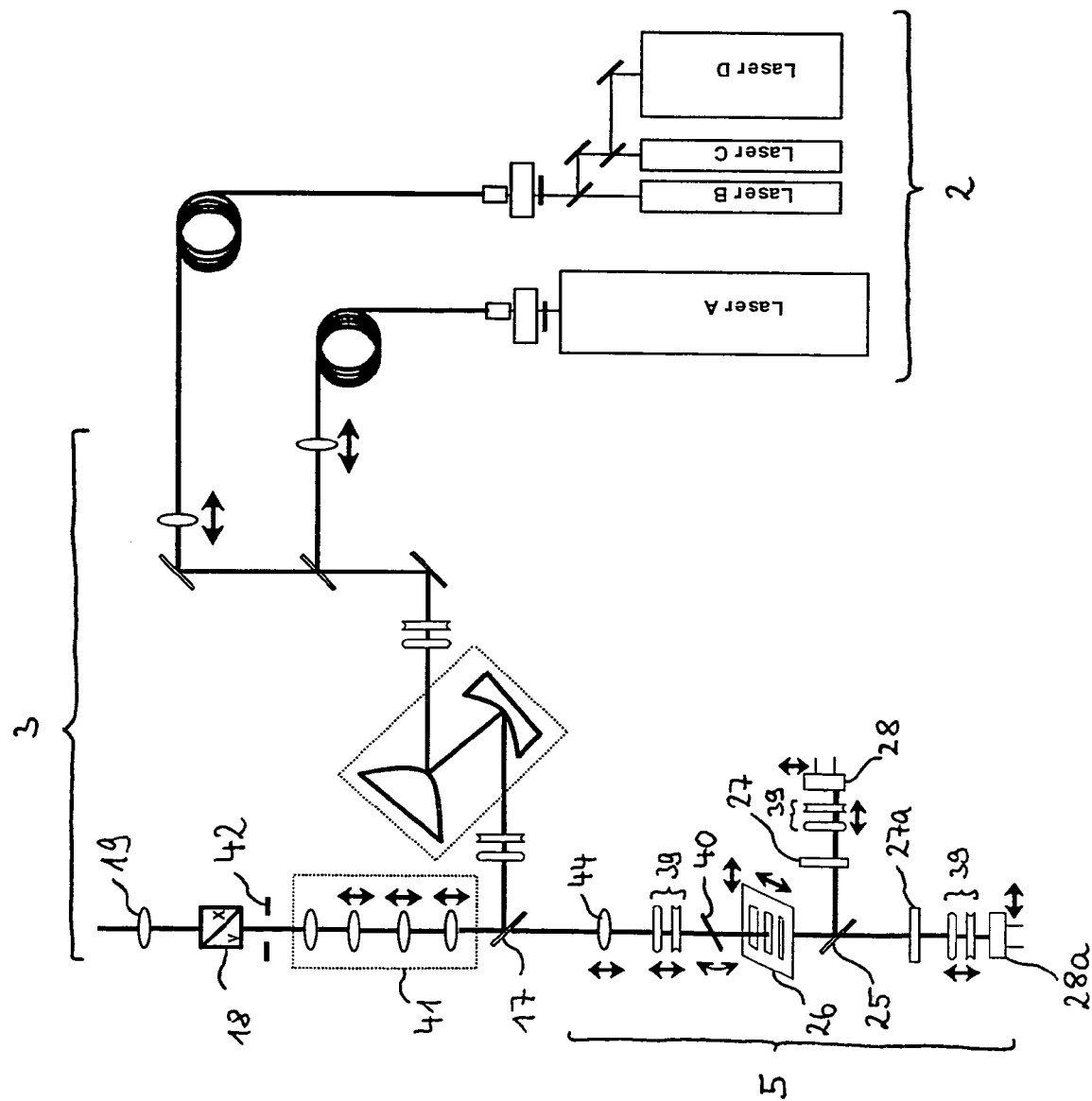

FIG. 12 shows a modified construction of that in FIGS. 1, 2, in which a slit aperture with stationary slits of different sizes is arranged on a slider. In this variant of the slit aperture 26, we can, for example, be dealing with an appropriately structured chrome mask whose position is changed by a motor. As distinct from the construction in FIG. 2, the slit aperture is also arranged next to the secondary color splitter 25; this represents an alternative to the setup in FIG. 2.

Figure 13:
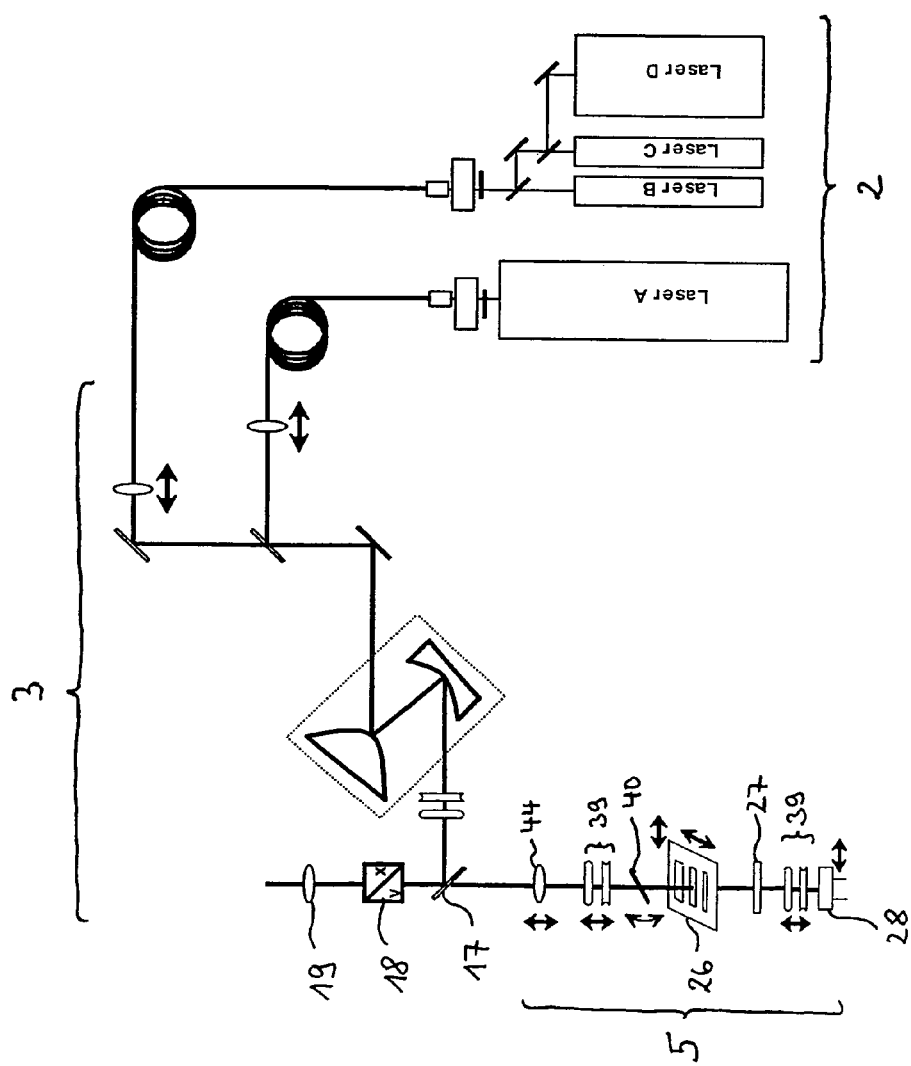

FIG. 13 shows a simplified mode of construction of the layout in FIG. 12, in which the zoom magnification has been dropped, that is to say, the optical zoom system 41 as well as the cylindrical telescope 37 have been omitted. FIG. 13 is also an example of construction with only one spectral channel, that is to say, a setup with several spectral channels in the detector module 5 has been omitted. A secondary color splitter 25 is not provided. In order to simply be able to subsequently equip the mode of construction in FIG. 13 with a multiple channel detector module 5, it is purposeful in place of the secondary color splitter 25 to arrange a compensation glass (not represented in FIG. 13), which can later be replaced by the secondary color splitter.

Figure 14:
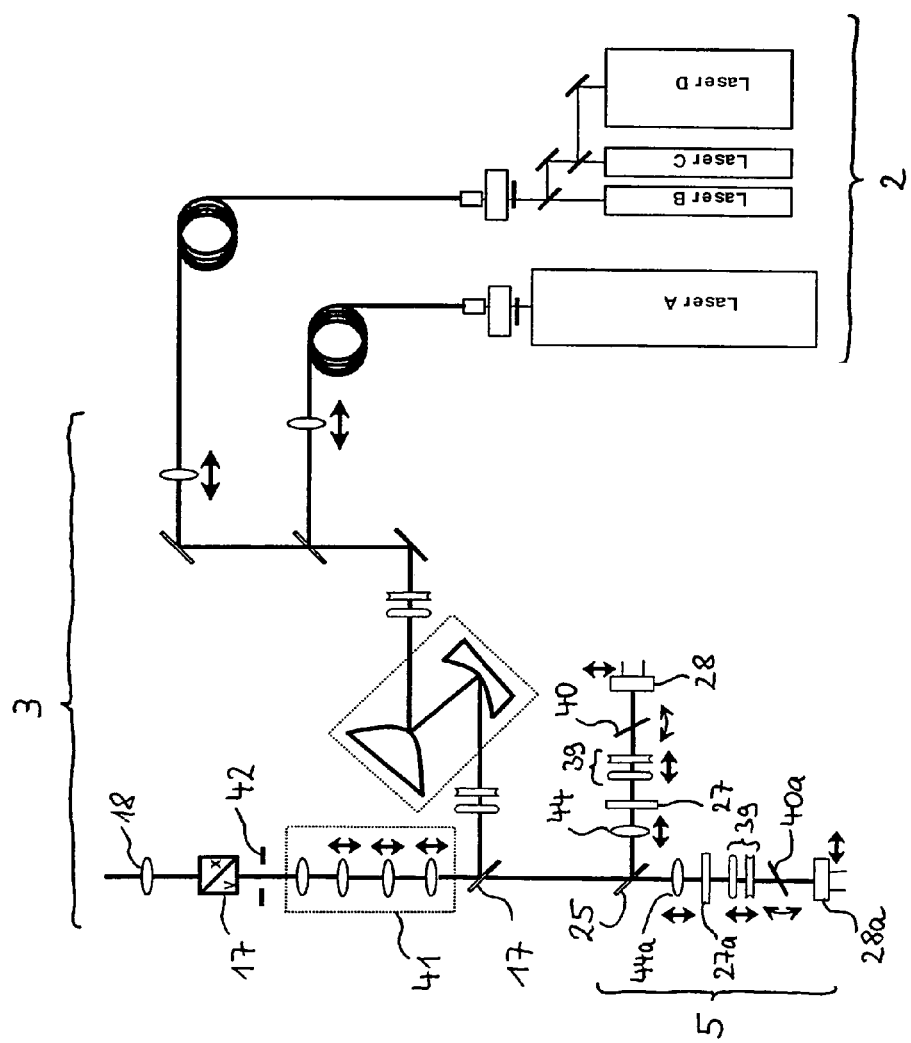

In FIG. 14, another embodiment of a laser scanning microscope 1 is shown whose detectors 28, 28*a* are now formed as CCD-lines which lie in the confocal plane otherwise containing the slit diaphragms and which therefore assume the function thereof. If one uses a detector array with an appropriate readout, the effect of varying the size of the slit aperture can be realized by a corresponding selection of the read-out region on the detector array.

Figure 15:
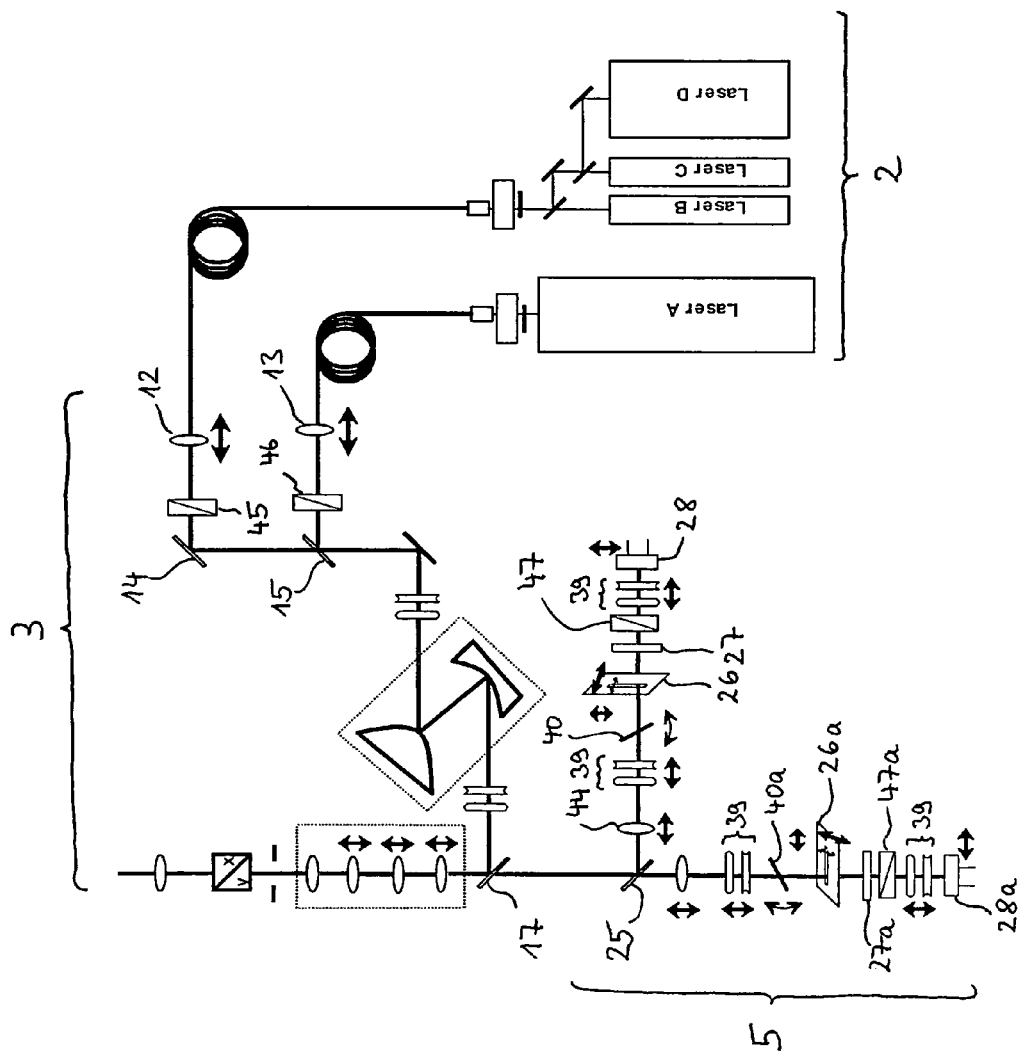

FIG. 15 shows another construction variant in which polarizers 45, 46 are inserted in the path of the illuminating beam and analyzers 47, 47*a* are connected in the detector paths. These subassemblies can, for example, be designed as motor-driven to move in the path of the beam. Polarization-sensitive excitation or detection is particularly advantageous for the analysis of linear or non-linear Raman signals in order to be able to classify the symmetry of analyzed molecular vibrations or to suppress non-Raman resonant background signals.

Figure 16:
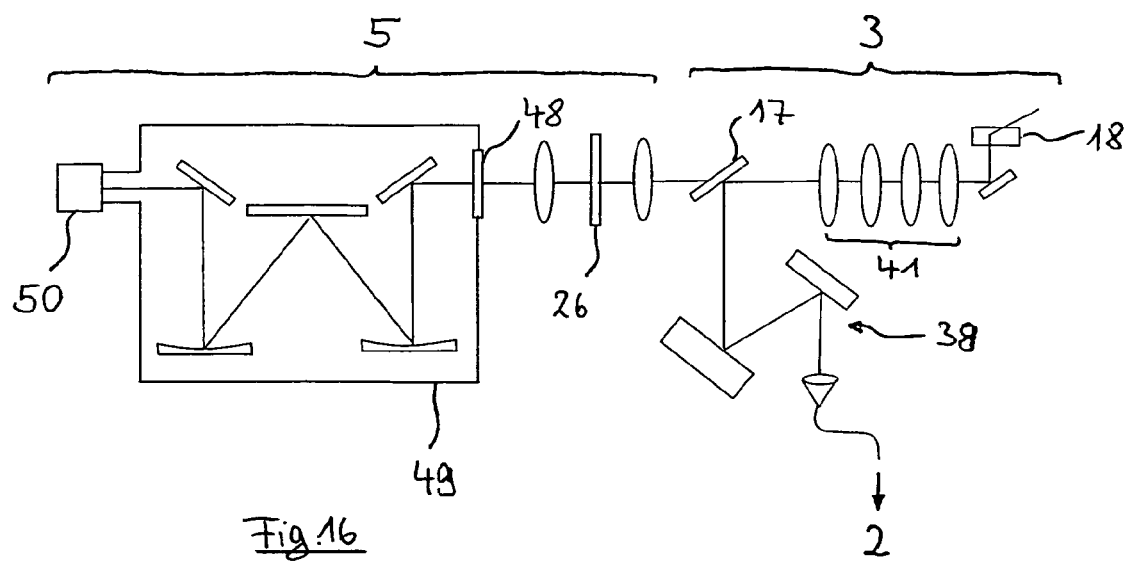
Figure 17:
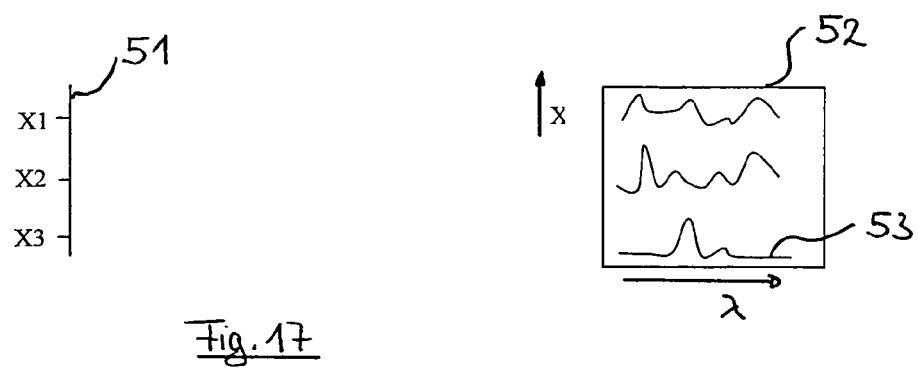

The forms of embodiment for the laser scanning microscope described up to this point provide spectrally discrete detector paths in the detector module 5. If one wishes to simultaneously analyze a wide band spectral range, then the conception systematically represented in FIG. 16 can be applied. FIG. 16 shows the scan module 3 as well as the detector module 5 in partial section and simplified. The beam passing the slit aperture 26 from the specimen is guided into the inlet window 48 of a spectrometer 49 which spectrally breaks down the entering line-shaped radiation crosswise to the direction of the line and conducts it to a two-dimensionally resolving detector unit, which is a CCD-camera 50 in the exemplary embodiment. A focal line 51 on the specimen, represented in FIG. 17, is then split up in an image 52 also shown in FIG. 17, whereby the direction designated by X signifies the focal resolution, and, in contrast, the direction perpendicular to that, designated by $\lambda$ in FIG. 17, codes the spectral composition of the radiation at the given site. For the sake of visualization, a series of curves 53 are entered in the image 52 to symbolize the spectral composition. In reality, one naturally does not obtain curves 53, but rather the pixels of the CCD-camera 50 arranged in the $\lambda$-direction are illuminated with varying intensities, depending on the spectral composition of the irradiation from the specimen recorded on the site.

In a simplified form of embodiment, the slit aperture 26 can be realized by an entrance slit of the spectrometer 49; the slit aperture 26 and the inlet window 48 formed as an entrance slit then coincide.

In particular, in the case of the use of holographic Raman notch filters, it is also conceivable in Raman microscopy to use a simple monochromator instead of the two-way or three-way spectrometers.

Figure 27:
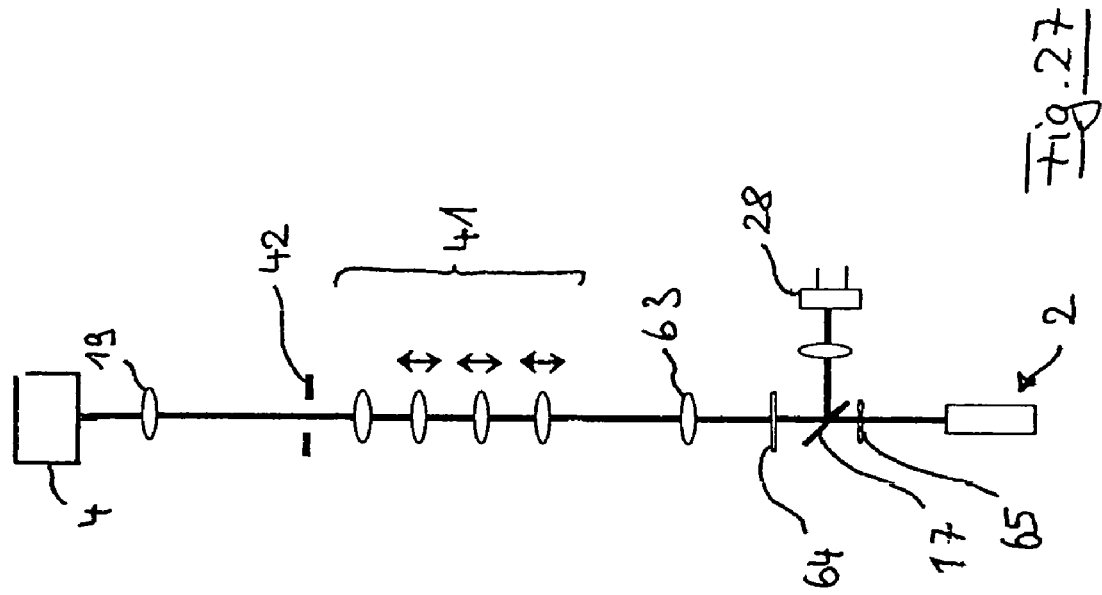

Another possible mode of construction for a laser scanning microscope 1 is shown in FIG. 27, to which an annexed Nipkow disc has been integrated. The light source module 2, which is highly simplified in its representation in FIG. 27, illuminates a Nipkow disc 64 through the primary color splitter 17 via a mini-lens array 65, as described, for example, in the U.S. Pat. No. 6,028,306, WO 88 07695 or DE 2360197 A1. The pinholes of the Nipkow disc illuminated via the mini-lens array 65 are imaged onto the specimen located in the microscope module 4. In order to be able to also vary the size of the image on the specimen side, an optical zoom system 41 is again provided here.

As a modified arrangement of the mode of construction in FIG. 2, in the Nipkow scanner, illumination is effected by passing through the primary color splitter 17 and the radiation to be detected is reflected out. Furthermore, the detector 28 is now designed with focal resolving power so as to also properly enable parallel scanning of the multiple spots illuminated which is achieved by the use of a Nipkow disc 46. Furthermore, between the Nipkow disc 64 and the optical zoom system 41, is arranged an appropriate stationary optical lens system 63 with positive refracting power which transforms the radiation divergently exiting through the pinholes of the Nipkow disc 64 into suitable ray bundle diameters. The primary color splitter 17 for the Nipkow construction in FIG. 11 is a classic dichroic beam splitter, that is to say, it is not the aforementioned beam splitter with a slit-shaped or punctiform reflecting region.

The optical zoom system 41 corresponds, for example, to the mode of construction previously detailed, whereby the scanner 18 naturally becomes redundant due to the Nipkow disc 64. Nevertheless, said scanner can be provided if one wishes to undertake the selection of a region of interest (ROI) detailed in FIG. 10. The same applies to the Abbe König prism.

Figure 26:
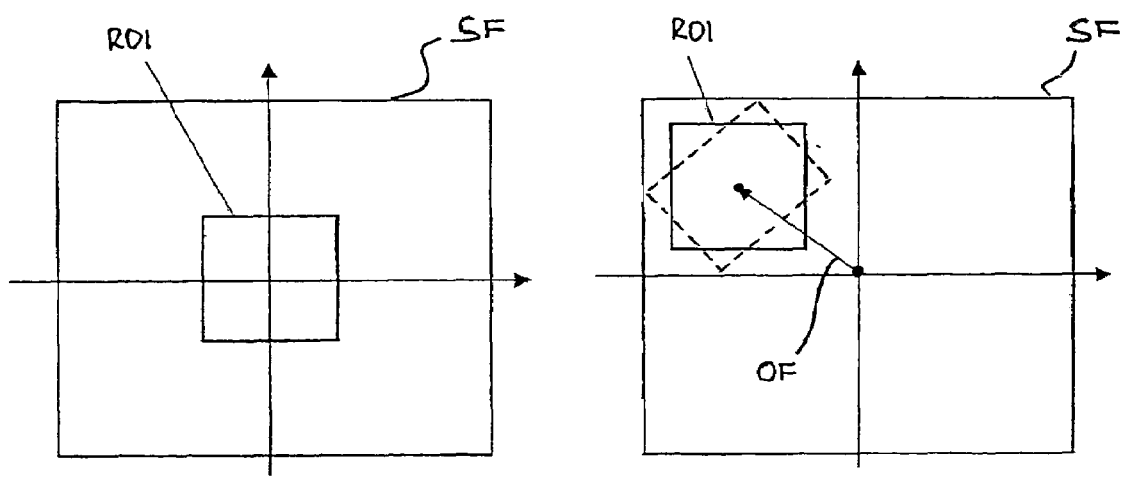
Figure 28:
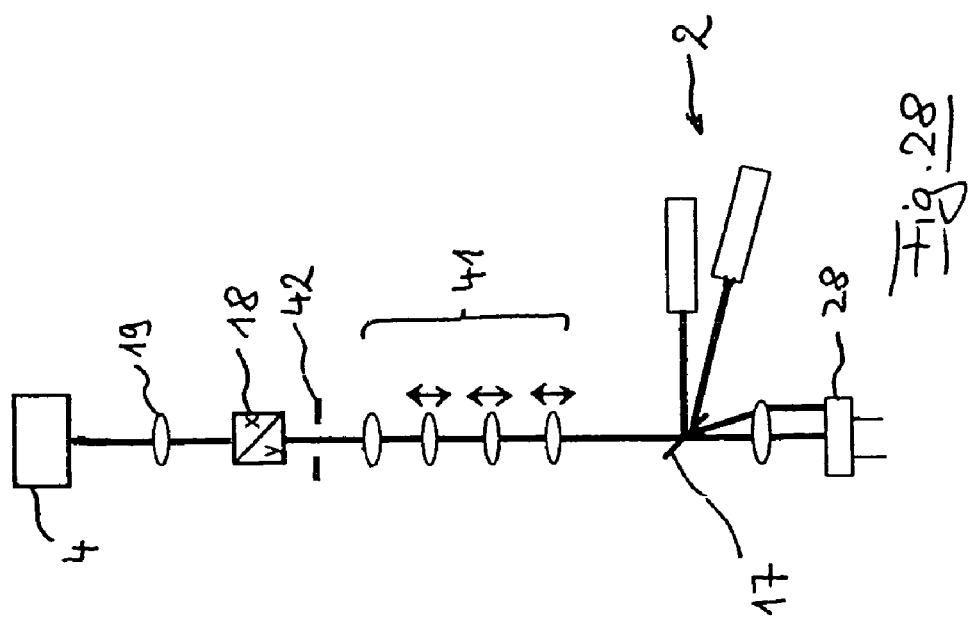

An alternate approach with multiple spot scanning is shown in schematic representation in FIG. 28, in which several light sources obliquely beam into the scanner pupil. Here also, a zooming function can be realized by the use of an optical zoom system 41 for imaging, to be configured between the primary color splitter 17 and the scanner 18, as represented in FIG. 26. By simultaneous beaming of light bundles from different angles into a plane conjugate with the pupil, light spots are produced on a plane conjugate with the plane of the object, which are simultaneously guided by the scanner 18 over subregions of the total object field. The information on the image is generated by the evaluation of all subimages on a matrix detector 28 with mapping resolving power.

As another form of embodiment coming under consideration is multiple point scanning, as described in the U.S. Pat. No. 6,028,306, whose revelation is fully integrated here in terms of this. Here as well, a detector 28 with positional resolving power is to be provided as in FIGS. 27 and 28. The specimen is then illuminated by a multiple point light source, which is realized by a beam expander with a post-positioned microlens array, which illuminates a multiple aperture plate in such a manner that a multiple point light source is produced.

The described invention represents a significant expansion of the application possibilities for high speed confocal laser scanning microscopes. The significance of such expanded development can be deduced from the standard literature on cell biology and from the processes described there on superfast cellular and subcellular processes[1] and from the applied methods of analysis with a multitude of dyes[2]. See, for example:

[1]B. Alberts et al. (2002): Molecular biology of the Cell; Garland Science.
[1,2]G. Karp (2002): Cell and Molecular Biology: Concepts and Experiments; Wiley Text Books.
[1,2]R. Yuste et al. (200): Imaging neurons—a laboratory Manual; Cold Spring Harbor Laboratory Press, New York.
[2]R. P. Haugland (2003): Handbook of fluorescent Specimens and research Products, 10$^{th}$ Edition; Molecular Specimens Inc. and Molecular Specimens Europe BV.

The invention has an especially great significance for the following processes and developments:

Development of Organisms

The described invention is, among other things, suited for the analysis of developmental processes which are characterized foremost by dynamic processes ranging from tenths of seconds to hours in duration. Exemplary applications are described here, for example, at the level of cell groups and whole organisms:

M. A. Abdul-Karim et al. describe in 2003 in Microvasc. Res., 66: 113-125 a long term analysis of changes in the blood vessels of living animals wherein fluorescent images were recorded at intervals over several days. The 3D data records were evaluated with adapted algorithms to schematically illustrate the trajectories of movement.

D. R. Soll et al. describe in 2003 in Scientific World Journ., 3: 827-841 a software based analysis of movement of microscopic data on the nuclei and pseudopodia in living cells in all 3 spatial dimensions.

R. Grossmann et al. describe in 2002 in Glia, 37: 229-240 a 3D analysis of the movements of microglia cells in rats, whereby the data was recorded for up to 10 hours. At the same time, after traumatic injuries, the neuroglia also react with rapid reactions so that a high data rate and correspondingly large volumes of data are generated.

This applies to the following points of emphasis in particular:

Analysis of living cells in a 3D environment whose neighboring cells sensitively react to laser illumination and which must be protected from the illumination of the 3D-ROI [regions of interest];

Analysis of living cells in a 3D environment with markers, which are subject to targeted 3D bleaching by laser illumination, e.g. FRET experiments;

Analysis of living cells in a 3D environment with markers, which are subject to targeted bleaching by laser illumination, and at the same time, are also to be observed outside of the ROI, e.g., FRAP and FLIP experiments in 3D;

Targeted analysis of living cells in a 3D environment with markers and pharmaceutical agents, which exhibit manipulation related changes by laser illumination; e.g., activation of transmitters in 3D;

Targeted analysis of living cells in a 3D environment with markers, which exhibit manipulation related changes in color by laser illumination; e.g., paGFP, Kaede;

Targeted analysis of living cells in a 3D environment with very weak markers, which require e.g., an optimal balance in confocality against detection sensitivity.

Zhang et al. describe in 2001 in Neuron, 31: 261-275 live cell imaging of GFP transfected nerve cells wherein the mobility of granules was analyzed based on a combination of bleaching and fluorescent imaging. To this end, the dynamics of the nerve cells set very high requirements for the imaging speed.

Molecular Interactions

The described invention is particularly well suited for the representation of molecular and other subcellular interactions. To this end, very small structures with high speeds (in the range of hundredths of seconds) must be represented. In order to resolve the spatial position necessary for the observation of molecular interactions, indirect techniques must also be applied such as, for example, FRET with ROI bleaching. Exemplary applications are, for example, described here:

M. A. Petersen and M. E. Daily describe in 2004 in Glia, 46: 195-206 a two channel visual recording of live hippocampus cultures in rats, whereby the two channels are spatially recorded and plotted in 3D for the markers of lectin and sytox over a longer period of time.

N. Yamamoto et al. describe in 2003 in Clin. Exp. Metastasis, 20: 633-638 a two color imaging of human fibrosarcoma cells, whereby green and red fluorescent proteins (GFP and RFP) are simultaneously observed in real time.

S. Bertera et al. describe in 2003 in Biotechniques, 35: 718-722 a multicolor imaging of transgenic mice marked with timer reporter protein, which changes its color from green into red after synthesis. The recording of the image is effected as a rapid series of 3-dimensional images in the tissue of the live animal.

Transmission of Signals Between Cells

The described invention is excellent and very well suited for the analysis of signal transmission processes that are usually extremely rapid. These predominantly neurophysiological processes set the highest demands on temporal resolution since the activities mediated by ions Living cells in a 3D tissue group with varying multiple markers, e.g. CFP, GFP, YFP, Ds-red, Hc-red and such similar.

Living cells in a 3D tissue group with markers, which exhibit function related changes in color, e.g., Ca+-marker.

Living cells in a 3D tissue group with markers, which exhibit development related changes in color, e.g. transgenic animals with GFP Living cells in a 3D tissue group with markers, which exhibit manipulation related changes in color by laser illumination, e.g., paGFP, Kaede Living cells in a 3D tissue group with very weak markers, which require a restriction in confocality in favor of detection sensitivity.

The last mentioned item in combination with the ones preceding it.

Transport Processes in Cells

The described invention is excellent in its suitability for the analysis of intracellular transport processes since the truly small motile structures involved here are to be represented, e.g. proteins with high speeds (usually in the range of hundredths of seconds). In order to capture the dynamics of complex transport processes, applications are also often used such as FRAP with ROI bleaching. Examples for such studies are described here, for example:

F. Umenishi et al. describe in 2000 in Biophys. J., 78: 1024-1035 an analysis of the spatial motility of aquaporin in GFP transfected culture cells. To this end, targeted spots were locally bleached in the cell membranes and the diffusion of the fluorescence was analyzed in the surroundings.

G. Gimpl et al. describe in 2002 in Prog. Brain Res., 139: 43-55 experiments with ROI bleaching and fluorescent imaging for the analysis of mobility and distribution of GFP-marked oxytocin receptors in fibroblasts. To realize this task, very high demands are made on spatial positioning and resolution as well as on the direct temporal sequence of bleaching and imaging.

transpire within the range of hundredths to smaller than thousandths of seconds. Exemplary applications of analyses on the muscle and nervous systems are described here, for example:

G. Brum et al. describe in 2000 in J. Physiol. 528: 419-433 the localization of rapid Ca+ activities in muscle cells of the frog after stimulation with caffeine as transmitter. The localization and micrometer-precise resolution succeeded only by virtue of the high speed confocal microscope used.

H. Schmidt et al. describe in 2003 in J. Physiol. 551: 13-32 an analysis of Ca+ ions in axons of transgenic mice. The study of rapid Ca+transients in mice with modified Ca+ binding proteins could only be conducted with a high resolution confocal microscope since both the localization of Ca+ activity within the nerve cell and its exact temporal kinetics play an important role.

The invention claimed is:

1. Confocal laser scanning microscope for the detection of at least one specimen region, comprising:
    illuminating means for providing a line-shaped illuminating beam for illuminating a specimen in several points or regions in parallel,
    an illuminating beam path traveled by the illuminating beam,
    scanning means for guiding the illuminating beam over the specimen while scanning and for descanning radiation emitted by the specimen,
    detector means for simultaneously detecting several illuminated specimen points lying on a line, the detector means including:
        (a) at least one detector unit, and
        (b) confocal image producing means for producing an at least partially confocal image of the specimen from the descanned radiation and imaging it onto the at least one detector unit, the confocal image producing means including a slit aperture unit comprising a slider and a plurality of fixed-width slits on the slider, each of the slits being stationary in its position on the slider and having a slit width different from the slit widths of the other slits, wherein the slit width establishes the depth of focus with which the descanned radiation can be detected, and wherein the confocal image is imaged through a single one of the slits, and the slider is movable to change the slit through which the confocal image is imaged.

2. Laser scanning microscope in accordance with claim 1, further comprising:
    an objective positioned in the illuminating beam path for detecting the specimen,
    an optical zoom system for producing an intermediate image therein, the optical zoom system being positioned in front of the objective in the illuminating beam path and having an exit pupil, the optical zoom system further forming an entrance pupil of the illuminating beam path and having at least one of variable magnification and variable imaging length into the exit pupil.

3. Laser scanning microscope in accordance with claim 2, further comprising aperture means arranged in the exit pupil for affecting the size of the exit pupil independently from the setting on the optical zoom system, wherein the size of the exit pupil is preferably smaller than the size of the entrance pupil (OP[EP]/EnP) of the objective.

4. Laser scanning microscope in accordance with claim 2, further comprising control means for providing variable control of the optical zoom system in a first mode of operation with variable magnification and constant imaging length and a second mode of operation with variable imaging length with constant magnification.

5. Laser scanning microscope in accordance with claim 2, wherein the scanning means includes a cylindrical telescope which magnifies the line length of the illuminating beam and which, for the optical zoom system, is switched to a zoom factor of smaller than one in the beam path.

6. Laser scanning microscope in accordance with claim 1, further comprising converting means for generating a line-shaped illuminating beam from a cross-sectionally inhomogeneous source beam, specifically from a Gaussian source beam, wherein the converting means includes an aspherical, convex mirror which is more pronouncedly curved in the region of the point of incidence of the source beam than in regions remote from the point of incidence.

7. Laser scanning microscope in accordance with claim 6, wherein the mirror is wedge-shaped with a rounded off vertex.

8. Laser scanning microscope in accordance with claim 7, wherein the mirror has a reflecting surface that satisfies the function $y^2/[c+(c^2-(1-Q)y^2)^{1/2}]$ relative to the Cartesian (x, y, z)-coordinates, wherein "c" is a radius of curvature of the vertex of the cone and "Q" is the conic constant.

9. Laser scanning microscope in accordance with claim 7, wherein the mirror has a reflecting surface which is additionally curved along the longitudinal axis of the dome.

10. Laser scanning microscope in accordance with claim 9, wherein the aspheric mirror satisfies the function $f(x, y)=[(a(y)-r_x)^2-x^2]^{1/2}$, wherein $r_x$ is the radius of curvature along the longitudinal axis of the vertex and $a(y)=y^2/[c+(c^2-(1-Q)y^2)^{1/2}]$.

11. Laser scanning microscope in accordance with one of the claims 6, wherein the mirror has a symmetrical axis that lies at a 4° to 20° angle to the incident axis of the source beam.

12. Laser scanning microscope in accordance with one of the claims 6, further comprising a concentrating reflecting mirror arranged after the aspherical mirror.

13. Laser scanning microscope in accordance with claim 12, wherein the concentrating reflecting mirror is one of cylindrical and toric.

14. Laser scanning microscope in accordance with claim 13, wherein the concentrating reflecting mirror exhibits a radius of curvature equal to $(r_x+2d)$, wherein d is the distance between the aspheric mirror and the concentrating reflecting mirror.

15. Laser scanning microscope in accordance with claim 1, wherein the scanning means includes two independently controllable and operable scanning units, one of the scanning units effecting a decentralized zoom function.

16. Laser scanning microscope in accordance with claim 1, wherein the detector unit includes a two-dimensional radiation sensor, and a spectrometer which spectrally splits up the line-shaped beam crosswise to the beam and guides it to the two-dimensional radiation sensor.

17. Laser scanning microscope in accordance with claim 16, wherein the spectrometer includes an entrance slit which serves as a confocal aperture.

18. Laser scanning microscope in accordance with claim 1, wherein the detector unit includes a two-dimensional radiation sensor and a streak camera, which temporally splits up the line-shaped beam crosswise to the beam and guides it to the two-dimensional radiation sensor.

19. Laser scanning microscope in accordance with claim 1, wherein the illuminating means includes at least one polarizer and wherein the detector means includes at least one polarization analyzer in the detector assembly.

20. Laser scanning microscope in accordance with claim 1, wherein the detector means includes several spectral channels, and one detector unit for each respective spectral channel.

21. Laser scanning microscope in accordance with claim 20, further comprising a common slit aperture preceding all of the spectral channels.

22. Laser scanning microscope in accordance with claim 21, wherein the slit aperture has an adjustable aperture width.

23. Laser scanning microscope in accordance with claim 1, wherein the slit aperture unit precedes all of the spectral channels.

24. Laser scanning microscope in accordance with claim 23, wherein the at least one plane parallel transparent plate comprises at least one of a pivoting plate and at least one biaxial tilting plate.

25. Laser scanning microscope in accordance with claim 23, wherein the at least one plane parallel transparent plate comprises at least two different uniaxial tilting plates.

26. Laser scanning microscope in accordance with claim 23, wherein the at least one plane parallel transparent plate comprises at least two different uniaxial pivoting plates.

27. Laser scanning microscope in accordance with claim 26, further comprising interchangeable elements in the path of the beam, and wherein the setting unit comprises a configuration of the interchangeable elements as operating parameters.

28. Laser scanning microscope in accordance with claim 26, further comprising positionally adjustable elements in the path of the beam and wherein the setting unit comprises a configuration of the adjustable elements as operating parameters.

29. Laser scanning microscope in accordance with claim 26, wherein the detector means performs the function of analyzing radiation of different wave lengths and the setting unit interprets the wave lengths in the beam path as operating parameters.

30. Laser scanning microscope in accordance with claim 23, further comprising a setting unit for setting the tilt position of the plate dependent on the value of an operating parameter of the optical configuration.

31. Laser scanning microscope in accordance with claim 30, wherein the control loop means performs at least one of the further functions of maximizing the radiation intensity in the detector means and minimizing the image shift/misalignment.

32. Laser scanning microscope in accordance with claim 23, further comprising control loop means for balancing the effects of at least one temperature errors and long term drift errors using the tilt position of the plate as a correcting variable.

33. Laser scanning microscope in accordance with claim 23, wherein the at least one plane parallel transparent plate comprises two independently drivable plates composed of materials with different dispersions for the purpose of setting a chromatically independent or targeted, chromatically dependent parallel offset/shift.

34. Laser scanning microscope in accordance with claim 23, wherein the at least one plane parallel transparent plate is constructed of two graduated plates with materials of different dispersions in order to compensate for chromatic cross aberrations in the path of the beam.

35. Laser scanning microscope in accordance with claim 23, wherein the at least one plane parallel transparent plate is arranged in front of the detector means in the beam path in order to center the image of the specimen region on the detector means.

36. Laser scanning microscope in accordance with claim 23, wherein the at least one plane parallel transparent plate is arranged in front of the detector means in the beam path in order to center an image of the slotted aperture (26) on the detector unit (28).

37. Laser scanning microscope in accordance with claim 23, further comprising at least one of a biaxial tilting plate and a pivotable plate and pivotable plates provided between the specimen region and the confocal aperture as well as between the aperture and the detector unit.

38. Laser scanning microscope in accordance with claim 23, further comprising at least one of two different uniaxial tilting plates and pivotable plates provided between the specimen region and the confocal aperture as well as between the aperture and the detector unit.

39. Process in accordance with claim 38, wherein the analyzing step comprises analyzing the specimen using one of coherent Stoke's spectroscopy and anti-Stoke's spectroscopy and hyper-Raman spectroscopy and stimulated Raman spectroscopy and Raman processes of the higher order.

40. Laser scanning microscope in accordance with claim 1, further comprising a correcting unit, provided in at least one of the illuminating means and the detector means, wherein the correcting unit includes a holding fixture in the beam path and at least one plane parallel transparent plate held in the holding fixture, and which can be driven by the holding fixture into at least one of a tilting movement and a pivoting movement around at least one axis so as to set a specific parallel offset/shift (dx, dy) of the beams in the beam path by changing the tilt position of the plate.

41. Process for laser scanning microscopy, using the laser scanning microscope according to claim 1, comprising the step of:

analyzing the specimen using Raman spectroscopy.

42. Process for analyzing developmental processes, comprising the step of:

analyzing dynamic processes ranging from tenths of seconds to hours, at the level of cell groups and entire organisms, using the laser scanning microscope according to claim 1.

43. Process for the analysis of intracellular transport processes, comprising the step of:

representing small motile structures, e.g. proteins with high speeds (usually in the range of hundredths of seconds), in particular, for applications such as FRAP with ROI bleaching, using the laser scanning microscope according to claim 1.

44. Process for the representation of molecular and other subcellular interactions, comprising the step of:

representing very small structures with high speeds for the resolution of submolecular structures, using the laser scanning microscope according to claim 1.

45. Process for analyzing rapid signal transmission processes, comprising the step of:

analyzing neurophysiological processes with high temporal resolution, for analyses in the muscle system and in the nervous system, using the laser scanning microscope according to claim 1.

46. Laser scanning microscope in accordance with claim 1, wherein the detector unit further includes a spectrally resolving element, and wherein the confocal imaging means images the descanned radiation onto the spectrally resolving element of the detector unit.

* * * * *